US012724662B2

(12) United States Patent
Cao

(10) Patent No.: US 12,724,662 B2
(45) Date of Patent: Sep. 1, 2026

(54) DETERMINING A FAULT PONT FOR ADDRESSING COMPUTER APPLICATION NOT RESPONDING PHENOMENON

(71) Applicant: Tencent Technology (Shenzhen) Company Limited, Shenzhen (CN)

(72) Inventor: Chen Cao, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 9 days.

(21) Appl. No.: 18/659,464

(22) Filed: May 9, 2024

(65) Prior Publication Data

US 2024/0289208 A1 Aug. 29, 2024

Related U.S. Application Data

(63) Continuation of application No. PCT/CN2023/090470, filed on Apr. 25, 2023.

(30) Foreign Application Priority Data

Jul. 13, 2022 (CN) ........................ 202210819928.7

(51) Int. Cl.
*G06F 11/07* (2006.01)

(52) U.S. Cl.
CPC ...... *G06F 11/0793* (2013.01); *G06F 11/0706* (2013.01); *G06F 11/079* (2013.01)

(58) Field of Classification Search
CPC ............. G06F 11/0706; G06F 11/0742; G06F 11/0778; G06F 11/079; G06F 11/0793;
(Continued)

(56) References Cited

U.S. PATENT DOCUMENTS

2018/0052760 A1* 2/2018 Khan-Afshar Mohammadi ......... G06F 11/3612
2019/0196937 A1* 6/2019 Wang .................... H04L 43/022
2019/0332513 A1* 10/2019 Zhou .................. G06F 11/3051

FOREIGN PATENT DOCUMENTS

CN 106155741 A 11/2016
CN 109144852 A 1/2019
(Continued)

OTHER PUBLICATIONS

Machine Translation of CN 110489318 (Year: 2019).*
(Continued)

*Primary Examiner* — Michael Maskulinski
(74) *Attorney, Agent, or Firm* — Banner & Witcoff, Ltd.

(57) ABSTRACT

This application discloses a data processing method and apparatus, a device, and a storage medium. The method includes: obtaining site information of various application not responding (ANR) phenomena among a plurality of ANR phenomena of a target application (APP), any ANR phenomenon being generated during running of the target APP based on system code of an operating system (OS), and the site information being used for describing an execution status of the system code during generation of a corresponding ANR phenomenon; performing commonality analysis on the site information of the various ANR phenomena to obtain a commonality analysis result, and determining, from the system code, a fault point at which the ANR phenomenon is generated based on the commonality analysis result; and repairing the system code based on the fault point, to run the target APP based on the repaired system code.

19 Claims, 10 Drawing Sheets

(58) Field of Classification Search
CPC .... G06F 11/36; G06F 11/3612; G06F 11/362; G06F 11/366
See application file for complete search history.

(56) References Cited

FOREIGN PATENT DOCUMENTS

| | | | | |
|---|---|---|---|---|
| CN | 110489318 A | * | 11/2019 | .......... G06F 11/3476 |
| CN | 114528184 A | | 5/2022 | |
| CN | 114880159 A | | 8/2022 | |

OTHER PUBLICATIONS

Fan et al., "Large-Scale Analysis of Framework-Specific Exceptions in Android Apps", 2018 ACM/IEEE 40th International Conference on Software Engineering, pp. 408-419 (Year: 2018).*

"Find the unresponsive thread", Android Developers website: https://developer.android.com/topic/performance/anrs/find-unresponsive-thread, Nov. 15, 2023 (Year: 2023).*

"Diagnose and fix ANRs", Android Developers website: https://developer.android.com/topic/performance/anrs/diagnose-and-fix-anrs, Aug. 13, 2024 (Year: 2024).*

European Patent Office Office Action for EP Application No. 23838503.3-1203/4379554 PCT/CN2023090470, date Nov. 11, 2024, including search strategy details in p. 10.

Li, Mingliang et al., "Experience: Aging or Glitching? Why Does Android Stop Responding and What Cna We Do About It?", In the 26th Annual International Conference on Mobile Computing and Networking, Dated 2020.

Jul. 25, 2023—(WO) Search Report—App PCT/CN2023/090470.

* cited by examiner

Set a duration threshold

Does a timeout occur?

Yes

Trigger ANR

No

Remove an ANR trigger condition

```
Runtime.java -> exec
|  ProcessBuilder.java->start
|  |  ProcessImpl.java->start
|  |  |  UnixProcess.java -> new UnixProcess
|  |  |  |  UnixProcess.java -> forkAndExec
|  |  |  |  |  UnixProcess_md.c -> UNIXProcess_ forkAndExec
|  |  |  |  |  |  UnixProcess_md.c -> startChild
```

```
#if START_CHILD_USE_VFORK
/* we separate the call to vfork into a sepatate function to make
* very sure to  keep stack of child from corrupting stack of parent,
* as suggested by the scary gcc warning:
* warning :   variable "foo" migtht be clobbered by "longjmp" or "vfork"
*/
Volatile pid_t resultPid = vfork  ()
```
FIG. 6b
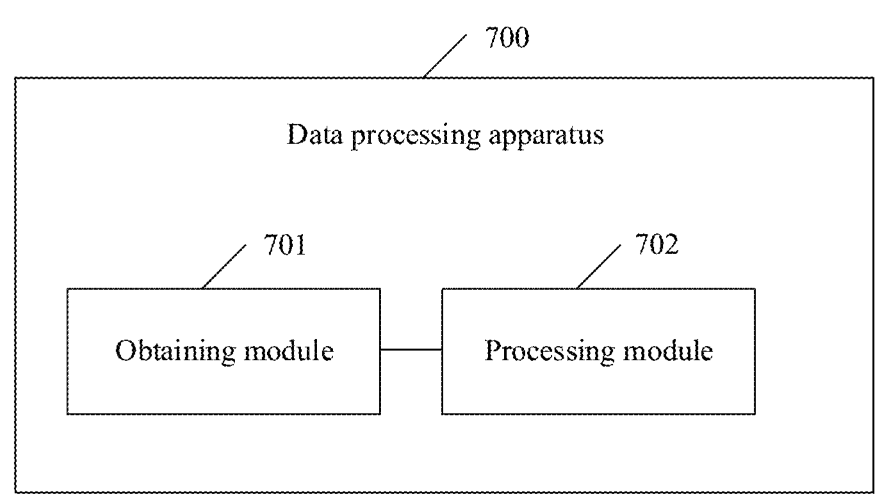
FIG. 7
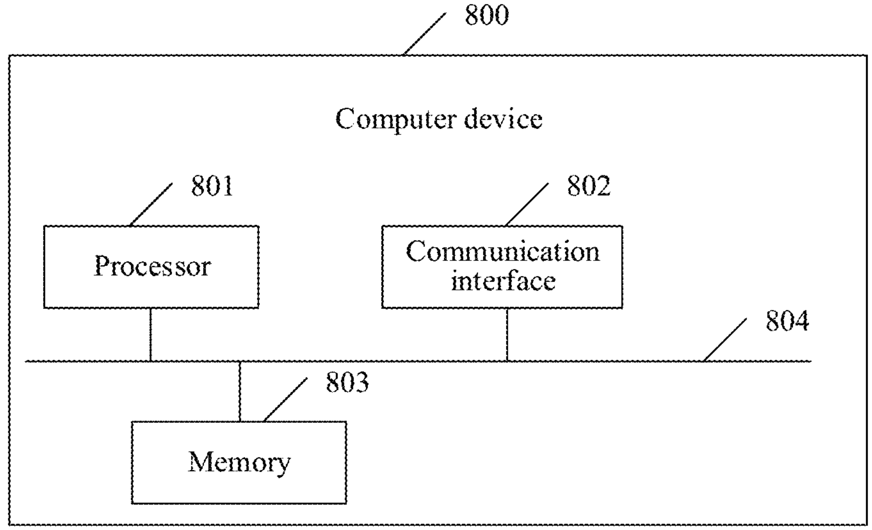
FIG. 8

DETERMINING A FAULT PONT FOR ADDRESSING COMPUTER APPLICATION NOT RESPONDING PHENOMENON

RELATED APPLICATION

This application claims priority to Chinese Patent Application No. 202210819928.7, filed with the China National Intellectual Property Administration on Jul. 13, 2022 and entitled "DATA PROCESSING METHOD AND APPARATUS, DEVICE, AND STORAGE MEDIUM", and is a continuation of PCT Application No. PCT/CN2023/090470 filed on Apr. 25, 2023, both of which are incorporated herein by reference in its entirety.

FIELD OF THE TECHNOLOGY

This application relates to the field of computer technologies, and in particular, to data processing.

BACKGROUND

With the development of computer technologies, the open source nature of some operating systems (OSs) allows the OS to be redeveloped and customized, including an increase in more interesting and practical functions provided by the OS. Such functionality results in improved user experiences.

The OS supports running of various applications (APPs), but if the APP response is not sufficiently sensitive, an application not responding (ANR) phenomenon may be generated. The existence of the ANR phenomenon may affect user experience. However, most of the current solutions to the ANR include locating an ANR problem encountered by a person based on analyzed historical experiences of others, and performing specific analysis on a specific ANR problem. This is limited by a specific scenario such as a particular OS version and/or a specific APP version, and might not necessarily guarantee that the ANR does not occur again due to other reasons after the current ANR is resolved. Accordingly an ANR solution might not be universal.

SUMMARY

Aspects described herein provide a data processing method and apparatus, a device, a storage medium, and a program product, which can effectively resolve an application not responding (ANR) phenomena of a target application (APP) from an operating system (OS) level, reduce a probability that any ANR phenomenon occurs, resolve the ANR with strong universality, and improve overall stability.

According to an aspect, a data processing method is provided, including:

obtaining site information of various ANR phenomena among a plurality of ANR phenomena of a target APP, any ANR phenomenon being generated during running of the target APP based on system code of an OS, the site information of the any ANR phenomenon being used for describing an execution status of the system code during generation of a corresponding ANR phenomenon;

performing commonality analysis on the site information of the various ANR phenomena to obtain a commonality analysis result, and determining, from the system code based on the commonality analysis result, a fault point at which the ANR phenomenon is generated, the commonality analysis result comprising common information in the site information of the various ANR phenomena; and repairing the system code based on the fault point, to run the target APP based on the repaired system code.

According to an aspect, a data processing apparatus is provided, including:

an obtaining module, configured to obtain site information of various ANR phenomena among a plurality of ANR phenomena of a target APP, any ANR phenomenon being generated during running of the target APP based on system code of an OS, the site information of the any ANR phenomenon being used for describing an execution status of the system code during generation of a corresponding ANR phenomenon; and a processing module, configured to perform commonality analysis on the site information of the various ANR phenomena to obtain a commonality analysis result, and determine, from the system code based on the commonality analysis result, a fault point at which the ANR phenomenon is generated, the commonality analysis result including common information in the site information of the various ANR phenomena;

the processing module being configured to repair the system code based on the fault point, to run the target APP based on the repaired system code.

Aspects described herein provide a computer device, including a processor, a memory, and a network interface, the processor being connected to the memory and the network interface, the network interface being configured to provide a network communication function, the memory being configured to store a computer program, and the processor being configured to invoke the computer program, to perform aspects of the data processing methods described herein.

Aspects described herein provide a computer-readable storage medium, having a computer program stored therein, the computer program, when executed by a processor, performing aspects of the data processing methods described herein.

Aspects described herein provide a computer program product, including a computer program or a computer instruction, the computer program or the computer instruction, when executed by a processor, implementing aspects of the data processing methods described herein.

According to various aspects described herein, the site information of the plurality of ANR phenomena of the target APP may be obtained, where any of the ANR phenomenon may be generated during running of the target APP based on the system code of the OS, and the corresponding site information may be used for describing the execution status of the system code during generation of the ANR phenomenon. The commonality analysis may be performed on the obtained site information of the various ANR phenomena, the execution status of the system code may be analyzed from the OS level, an underlying layer may be searched for common characteristics of the various ANR phenomena generated by the target APP, to obtain the commonality analysis result, then the fault point at which the ANR phenomena is generated may be determined from the system code based on the commonality analysis result, the system code may be repaired based on the fault point, and, as a result, an occurrence of the ANR phenomenon (e.g., the ANR phenomenon of the target APP) may be intercepted from an OS side during the running of the target APP based on the repaired system code, to avoid the generation of the ANR phenomena as much as possible. It may be learned that starting from the OS level, this manner is collecting and performing the commonality analysis on the site information of the various ANR phenomena that actually occur, and repairing the system code of a native OS based on a result obtained through analysis. In this way, the problem of the ANR phenomenon on the OS can be fundamentally resolved, the universality is strong, and a situation that any ANR phenomenon occurs in the target APP on the OS can be reduced, thereby effectively improving stability of a system or an APP.

BRIEF DESCRIPTION OF THE DRAWINGS

FIG. 6*b* is a schematic diagram of example logical code of an objective function according to one or more aspects described herein.

FIG. 7 is a schematic structural diagram of an example data processing apparatus according to one or more aspects described herein.

FIG. 8 is a schematic structural diagram of an example computer device according to one or more aspects described herein.

DETAILED DESCRIPTION

Figures 1A, 1B:
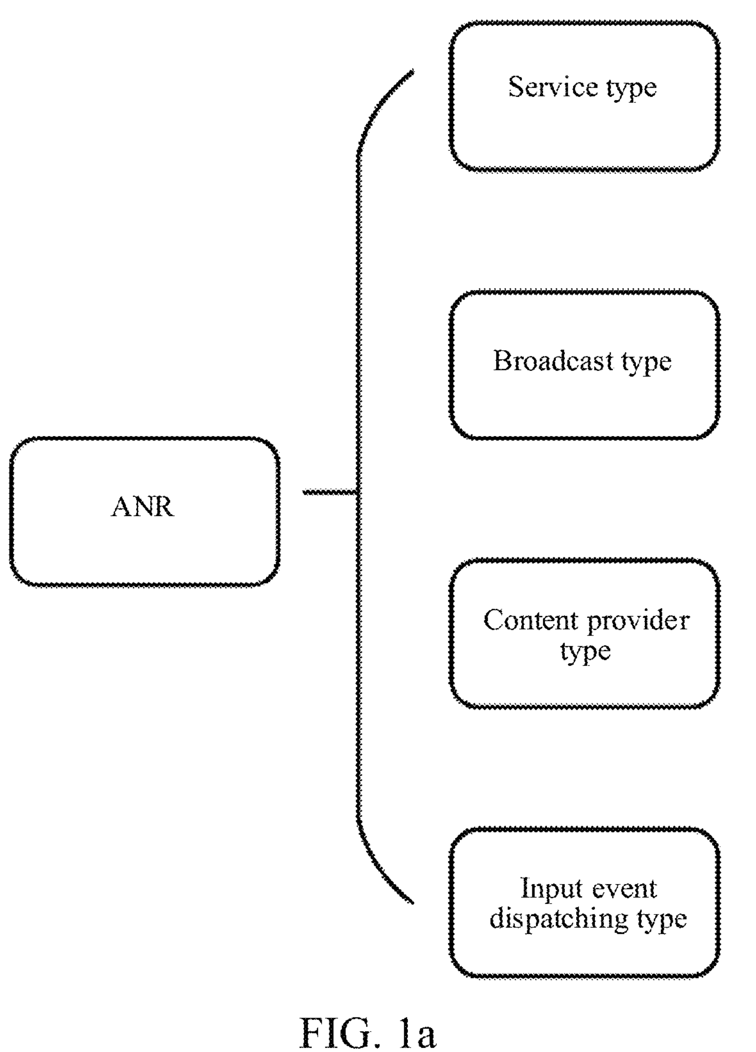
FIG. 1*a* is a schematic diagram of application not responding (ANR) type classifications according to one or more aspects described herein.
FIG. 1*b* is a schematic diagram of an example process of triggering an ANR phenomenon according to one or more aspects described herein.

To better understand aspects of the disclosure, terms and concepts that may be discussed are first described below.

Operating system: OS for short. The OS is a computer program that manages computer hardware and software resources, and is typically the most basic system software in a computer system. The OS may have functions such as processor management (for example, process control and process synchronization), memory management (for example, internal memory allocation and recycling and address mapping), device management (for example, file storage space management and file read/write management), and file management (for example, buffer management and virtual devices). There are many types of OSs, such as common Android (or referred to as an Android system), Linux, Windows, and iOS.

Kernel: Typically the core of an OS. The kernel may convert an inputted command into a machine language that computer hardware can understand, and the kernel may be directly connected to the hardware and may inform the hardware of a request initiated by an application (APP). Functions of the kernel may include but are not limited to process management, task scheduling, memory management, and the like. File management may include the kernel using a file system to organize files and maintaining monitoring of file data storage, a file status, and access settings by using the file system. The process management may include, in a multi-process environment, the kernel determining which process is run preferentially by a central processing unit (CPU) and a length of an allocated running time slice. The memory management may include the kernel detecting an internal memory space, and generating or destroying internal memory, to ensure that an APP is executed correctly.

Hard coding: Hard coding is a typical APP development practice of directly embedding data into source code of a program or another executable object. Unlike obtaining data from the outside or generating data during running, hard coding can usually be modified only through editing of source code and subsequent recompilation of an executable file. In a computer program or text editing, hard coding may be a method for replacing a mutable variable with a fixed value.

ANR: An abbreviation for Application Not Responding, which may also be referred to as Not Responding for short. An ANR is a very common phenomenon in an OS (for example, an Android system), which may be a bug (error) in code for a developer, but may cause poor user experience for a user. The OS requires some events to be completed within a specific period of time. If no effective response is obtained before a predetermined time is exceeded or a response time is excessively long, the ANR may result. Generally, a prompt box pops up (i.e., displayed) on a system interface to notify an object that a current APP does not respond. The object may choose to continue wait or force close, which is a self-protection mechanism of the OS. In addition, a process in which the ANR occurs may be directly closed during generation of the ANR without popping up the prompt box to prompt the object.

Target APP: A target APP as discussed herein may be any APP running in a computer device, for example, an APP in a terminal or a service program in a server. Through classification based on a manner in which the APP is installed, the target APP may be a free-installation APP (for example, an applet or a web APP (such as a shopping website)), or a third-party APP installed in a computer device. Through classification based on APP functions, the target APP may designated or identified as any one of a game APP, an audio and video APP, a social APP, a shopping APP, and the like.

A target APP may run based on an environment provided by an OS. During running of the target APP based on system code of the OS, the target APP may generate a situation of not responding (e.g., ANR). According to aspects described herein, the ANR generated by the target APP may include the following types: an ANR phenomenon of a service type, an ANR phenomenon of a broadcast type, an ANR phenomenon of a content provider type, and an ANR phenomenon of an input event dispatching type. An Android OS is used as an example. The ANR phenomenon of the service type may be an ANR phenomenon triggered by uncompleted execution of a service (Service Timeout) within a predetermined duration (for example, 2 s). The ANR phenomenon of the broadcast type may be an ANR phenomenon triggered by uncompleted execution of a broadcast (BroadcastQueue Timeout) within a predetermined duration (for example, 10 s). The ANR phenomenon of the content provider type may be an ANR phenomenon triggered by a timeout of a content provider (ContentProvider Timeout) after being published. The ANR phenomenon of the input event dispatching type may be an ANR phenomenon triggered by an input event dispatching timeout (InputDispatching Timeout). The foregoing four types of ANR may be classified as shown in the schematic diagram of FIG. 1*a*. Aspects of the generation process (or a trigger mechanism) of various classes of ANR phenomena of the APP mentioned above are described below.

From the perspective of system source code of the OS, the process of triggering the ANR may include three steps, as shown in FIG. 1*b*, including: setting a duration threshold, removing a trigger condition of APP not responding (e.g., APP not responding phenomenon, ANR for short), and triggering the ANR. Through setting of the duration threshold, it may be determined whether an actual processing duration of a corresponding event has expired (e.g., the actual processing duration is greater than a set duration threshold). The duration threshold may be set based on the corresponding ANR. Duration thresholds of different ANRs may be the same or different. If a timeout occurs, the ANR is triggered. If no timeout occurs, the ANR is not triggered, and the ANR trigger condition is removed. The removal of the ANR trigger condition herein may include cancellation of an original set duration threshold.

The processes of generating various ANR are described in detail below. Common concepts and some terms involved in the following ANR phenomena are described herein first.

Target APP: An APP currently running (e.g., executing) in a computer device. An APP process of the target APP may interact with a process (for example, a system service process) of an underlying layer of an OS to complete a corresponding event.

The system service process is used for starting and managing the whole Javaframework. Important services in a system may all be started in the system service process, for example, an activity manager service ActivityManagerService (AMS) and a window manager service WindowManagerService (WMS). In an Android OS, the system service process and the APP process of the target APP may be incubated through a Zygote process (a process for incubating a new process, referred to as an incubation process herein). The following content uses the system service process in the OS as an execution subject for description.

Four components of the Android OS are: Activity, Service, BroadCast Receiver, and Content Provider. ① Activity may be a visual interface operated by an object, and may provide a window for the object to complete an operation instruction. ② Service may be an APP component that may perform long-running operations in the background without an object interface. Since Service usually runs in the background and does not need to interact with the object, the Service component might not have a graphical object interface. The Service component may be configured to provide background service for another component or detect a running state of another component. ③ BroadCast Receiver may be configured to filter out an external event of interest to an APP (for example, an incoming call and when a data network is available) and respond to the external event. BroadCast Receiver may start an Activity or a Service to respond to information received by the activity or the service, or use NotificationManager (notification manager) to notify an object, for example, a notification of playing sound or a message displayed on a status bar. ④ ContentProvider (content provider) enables a specific dataset of an APP to be provided to another APP. The other APP may obtain data from the content provider or store data in the content provider through a ContentResolver class. Specifically, ContentProvider publishes data, and the data may be called through a ContentResolver object in combination with a universal resource identifier (URI). A URI may represent an address of a data operation. Each ContentProvider may have a unique address when publishing data.

(I) ANR Phenomenon of Service Type

A generation process of the ANR phenomenon of the service type may include: setting a service duration threshold in response to a service creation request sent by an APP process of a target APP; sending a service creation message to a service process, to notify, based on the service creation message, the service process to call one or more other processes to perform a service creation task and return feedback information after a service is successfully created; and generating the ANR phenomenon of the service type in a case that the feedback information returned by the service process is not received within the service duration threshold.

The service creation request sent by the APP process of the target APP may be used for requesting a system to create a service required by the target APP, for example, a listening service, and a notification service. In a cloud game scenario, the listening service is, for example, a service to listen for whether a player logs in, or a service to listen for whether a player is online. A system service process may set the service duration threshold in response to the service creation request initiated by the APP process. The service duration threshold may be used for detecting whether a timeout occurs during service creation. For example, a foreground service duration threshold and a background service duration threshold are both 20 seconds (s). Next, the system service process may send the service creation message to the service process, so that the service process may call one or more processes to perform the service creation task. The service required by the target APP may be created through the service creation task. The service process may be precreated by a component management service request in the system service process. Specifically, a main thread in the service process may call one or more other processes (e.g., processes different from the service process) to perform the service creation task. The one or more processes may include processes having a parent-child relationship, and a parent process and a child process may share an address space. After the service creation task is performed, the main thread in the service process may send feedback information to the system service process. The feedback information herein may be a notification message used for indicating completion of service creation. If the feedback information returned by the service process is not received within the service duration threshold, it indicates that a duration spent on the service creation task is greater than or equal to the service duration threshold, a service timeout occurs, and then the ANR phenomenon of the service type is generated. Conversely, if the feedback information returned by the service process is received within the service duration threshold, it indicates that the duration spent on the service creation task is less than the service duration threshold, and the ANR phenomenon of the service type is not generated.

Figure 1C:
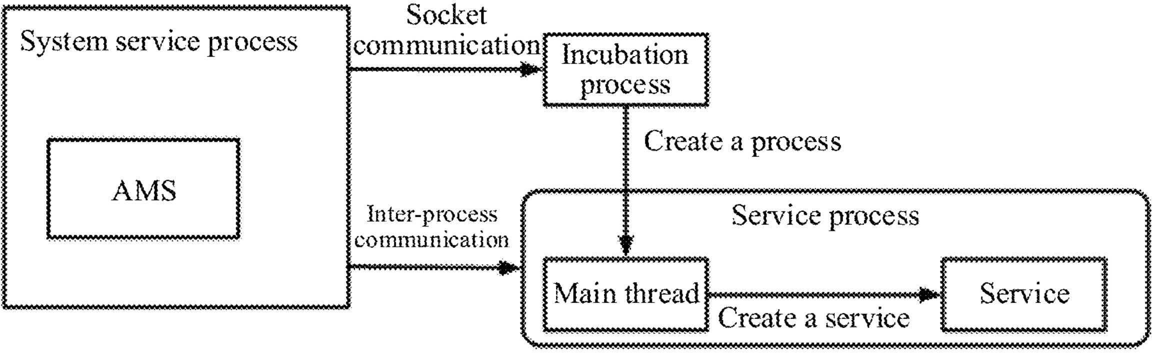
FIG. 1*c* is a schematic flowchart of an example process for starting a service according to one or more aspects described herein.

In the following description, ANR of an Android OS is used as an example. Service Timeout occurs during startService (start a service). The Service may specifically include the following two types: foreground service with a timeout duration (e.g., the service duration threshold) of 20 s and background service with a timeout duration of 200 s. A service is started in the target APP, which may be specifically implemented by calling a line of code of an API startService. In terms of the Android OS level, the process is shown in the example schematic flowchart of startService in FIG. 1*c*. The process of service creation and start may be mainly completed by the activity management service (AMS, ActivityManagerService) in the system service process. The AMS may request Zygote to create a creation process (Create Process) of a bearer service through socket (a communication manner) communication, which may include requesting to create a thread (ActivityThread, that is, a main thread). The service runs in an independent creation process. For a process of running a local service without starting a service, ActivityThread may play a role of a main thread of an APP. Next, Zygote may copy a Zygote process to generate a new process through a fork, and load resources related to ActivityThread into the new process. The AMS may send a request to create a service to ActivityThread in the newly generated process through Binder (an inter-process communication mechanism between processes) communication. ActivityThread may start and run the service. For example, the ActivityThread may create the service (createservice) by calling an onCreate method.

Figure 1D:
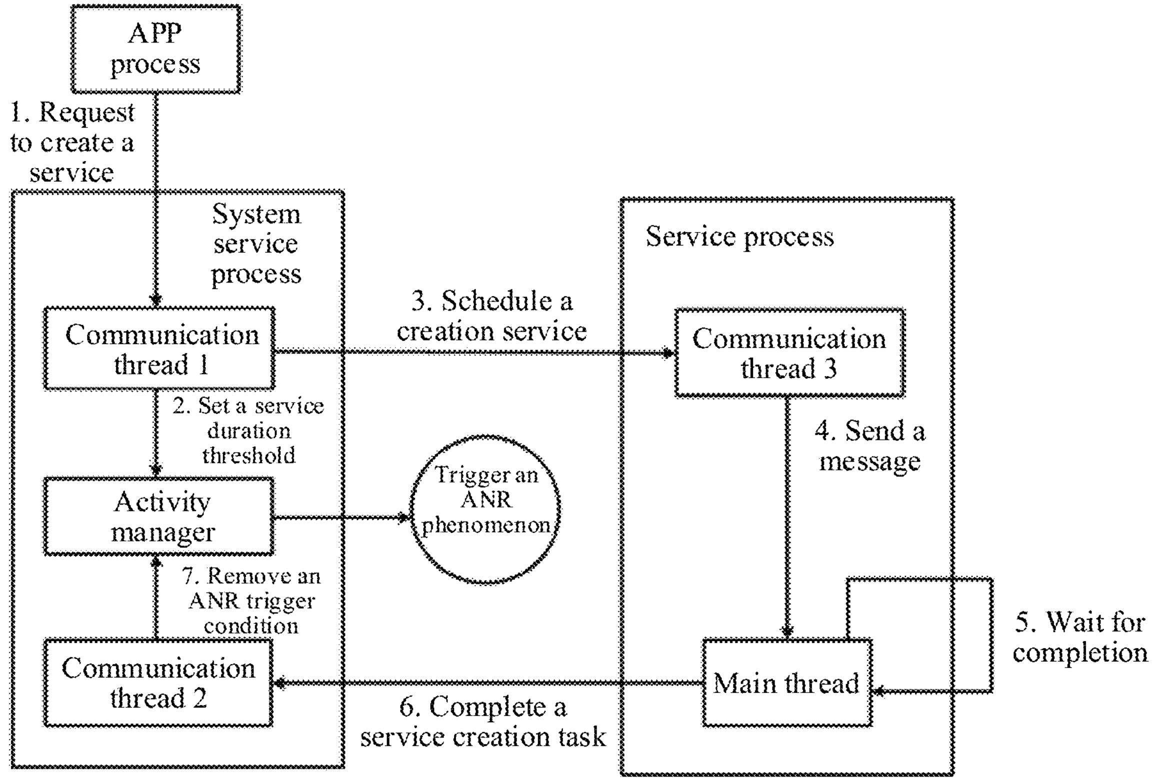
FIG. 1*d* is a schematic diagram of an example generation process of an ANR phenomenon of a service type according to one or more aspects described herein.

As shown in FIG. 1*d*, when an application process (e.g., an APP process) initiates a request to create a service (startService) (as shown in step 1), a system service process (e.g., a system_server process) in the system may allocate an idle thread binder_1 (e.g., a communication thread 1) to receive the request, then send a service timeout message SERVICE_TIMEOUT_MSG to a component manager ActivityManager and set a service duration threshold (as shown in step 2). Next, the binder_1 may notify binder_3 (e.g., a communication thread 3) of a service process (e.g., a service process) to prepare to perform a processing task (schedule a creation service scheduleCreateService) (as shown in step 3). The binder_3 may submit the notification to the main thread (e.g., a main thread, which may correspond to the main thread ActivityThread in FIG. 1*c*) after receiving the notification, and add the service creation event to a task queue of the main thread (e.g., send a message sendMessage) (as shown in step 4). Next, the main thread may perform a series of tasks, which may be service creation tasks and may include the process of creating the service by the thread ActivityThread in FIG. 1*c* (as shown in step 5), to complete start of a service life cycle (wait to finish waitToFinish). After completing the foregoing tasks, the main thread may report to the system_server process that the tasks are completed (e.g., the service creation task is completed serviceDoneExecuting), and then a thread binder_2 (e.g., a communication thread 2) in the system_server process may receive a message (as shown in step 6). If the service creation tasks are completed within a duration specified by the service duration threshold, the ANR trigger condition may be removed, and no ANR occurs. Otherwise, the ANR may occur (e.g., be triggered).

(II) ANR Phenomenon of Broadcast Type

A generation process of the ANR phenomenon of the broadcast type may include: setting a broadcast duration threshold in response to a broadcast sending request initiated by an APP process of a target APP; sending a broadcast registration message to a broadcast receiving process, to notify, based on the broadcast registration message, the broadcast receiving process to call one or more other processes to perform a broadcast task and return feedback information after a broadcast is completed; and generating the ANR phenomenon of the broadcast type in a case that the feedback information returned by the broadcast receiving process is not received within the broadcast duration threshold.

A broadcast mechanism may be configured to perform communication among processes/threads. The broadcast may be divided into broadcast sending and broadcast receiving. The broadcast may include parallel broadcast and ordered broadcast. The ANR phenomenon usually occurs in a scenario of the ordered broadcast. Similar to the generation process of the ANR of the service type, the system service process may set the broadcast duration threshold in response to the broadcast sending request initiated by the APP process of the target APP. The APP process of the target APP may be a process where a broadcast sender is located. A system service process may send the broadcast registration message to the broadcast receiving process, so that a main thread of the broadcast receiving process may call one or more other processes to perform the broadcast task. The one or more processes may include processes having a parent-child relationship, and a parent process and a child process may share an address space.

The broadcast receiving process may be a process where the broadcast receiver is located, and may be configured to receive a broadcast message from another APP or system. The broadcast task may include broadcasting various events, for example, a broadcast for a date change and a broadcast for system start completion. In a cloud game scenario, the broadcast events may be, for example, a network switching broadcast and a network failure broadcast. Before the broadcast task is performed, a broadcast reception queue may be created based on the broadcast registration message to process the received broadcast events in an orderly manner. The main thread may return feedback information upon completion of processing of the broadcast tasks. The feedback information may be a notification message used for indicating completion of the broadcast tasks. If the feedback information returned by the broadcast receiving process is not received within the broadcast duration threshold, e.g., a duration spent on the broadcast tasks is greater than or equal to the broadcast duration threshold, a broadcast timeout may occur, and the ANR phenomenon of the broadcast type may be generated. Conversely, if the feedback information returned by the broadcast process is received within the broadcast duration threshold, it may indicate that the duration spent on the broadcast creation task is less than the broadcast duration threshold, and the ANR phenomenon of the broadcast type might not generated.

Figure 1E:
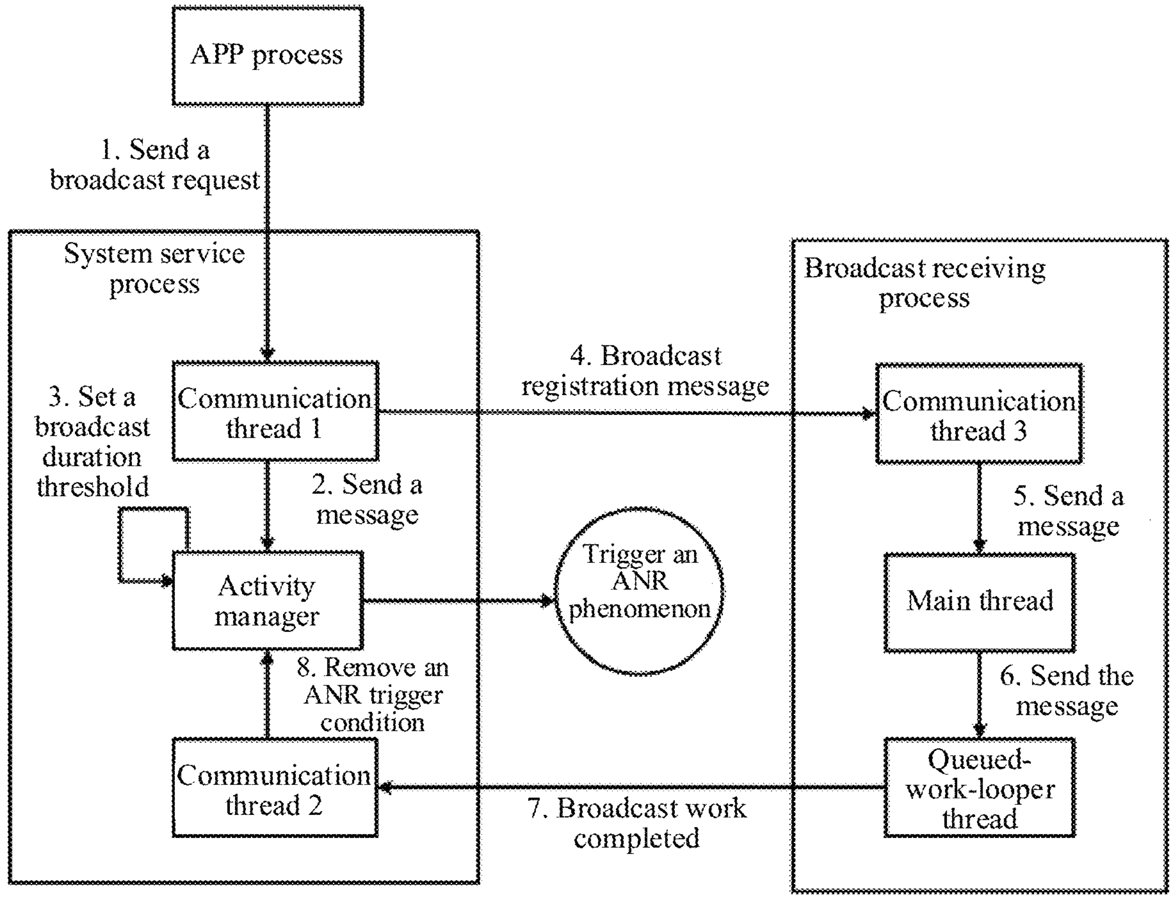
FIG. 1*e* is a schematic diagram of an example generation process of an ANR phenomenon of a broadcast type according to one or more aspects described herein.

In the following description, ANR of an Android OS is used as an example to describe the ANR of the broadcast type and reference may be made to a schematic diagram of an example generation process of ANR of a broadcast type shown in FIG. 1*e*. When an APP process of a target APP initiates a broadcast sending request (sendBroadcast) (as shown in step 1), the system service process may allocate an idle thread binder_1 (e.g., a communication thread 1) to receive the broadcast sending request, and then send a broadcast timeout message BROADCAST TIMEOUT_MSG (sendMessage) to an activity manager ActivityManager to set a broadcast duration threshold (as shown in step 2 to step 3). Next, the binder_1 notifies, through the broadcast registration message, a thread binder_3 (e.g., a communication thread 3) of the broadcast receiving process (e.g., a Receiver process) to prepare to perform a processing task (as shown in step 4). The binder_3 may send a message to the main thread (e.g., a main thread) after receiving the notification, and add the event to a task queue of the main thread (the communication thread 3 sends the message to the main thread, sendMessage, as shown in step 5). Next, the main thread may perform a series of tasks, such as broadcast tasks including start of a life cycle of broadcast reception. If it is found that a current process is still in the process of writing a file through SP (SharedPreferences, a data storage manner), after SP data persistence (e.g., the main thread sends a message to a queued-work-looper thread, sendMessage, as shown in step 6), the queued-work-looper thread may report to a system_server process that the broadcast tasks are completed (as shown in step 7). Conversely, the main thread may directly report that the broadcast tasks are completed (e.g., finishReceiver). Then a thread binder_2 (e.g., a communication thread 2) in the system_server process may receive the message. If all the tasks are completed within the broadcast duration threshold, an ANR trigger condition may be removed, and no ANR occurs (as shown in step 8). Otherwise, the ANR may occur.

(III) ANR Phenomenon of Content Provider Type

A generation process of the ANR phenomenon of the content provider type may include: detecting, in response to a request to obtain a content provider initiated by an APP process of a target APP, a start state of a content provider process corresponding to the content provider; creating the content provider process in a case that the start state indicates that the content provider process is not started, and notifying the content provider process to call one or more other processes, install the content provider, and return feedback information after installing the content provider, the content provider being equipped with an installation duration threshold; and generating the ANR phenomenon of the content provider type in a case that the feedback information returned by the content provider process is not received within the installation duration threshold.

The content provider may be configured to implement a data sharing function among different APPs. The content provider process may be configured to install and publish the content provider to provide content data, thereby implementing the data sharing function. A system service process may detect the start state of the content provider process in response to the request to obtain the content provider initiated by the APP process of the target APP. If the content provider process might not started, which indicates that the content provider process might not be created, the content provider process may be created and started. The content provider process may register the content provider process with the system service process after being created, set an installation duration threshold, and then notify the content provider process to perform an installation task of the content provider, which may be performed by a main thread in the content provider process by calling one or more other processes. The one or more processes may include processes having a parent-child relationship, and a parent process and a child process may share an address space.

After the installation may be completed, the feedback information may be returned. The feedback information may be a notification message used for indicating completion of the task of installing the content provider, and may be further used for instructing to publish the content provider to return content data provided by the obtained content provider. In a cloud game scenario, the content provider may be an address book in the system, and the provided content data may be related data of contacts in the address book. It may be understood that, a specific implementation of this application relates to data related to the address book, or the like. Object permission or consent may need to be obtained when the foregoing embodiments of this application are applied to specific products or technologies, and the collection, use, and processing of related data may need to comply with relevant laws and regulations and standards of relevant countries and regions.

If the feedback information returned by the content provider process is not received within the installation duration threshold, e.g., a duration spent on the installation task is greater than or equal to the installation duration threshold, a content provider timeout may occur, and then the ANR phenomenon of the content provider type may be generated. Conversely, if the feedback information returned by the content provider process is received within the installation duration threshold, indicating that the duration spent on the installation task of the content provider is less than the installation duration threshold, no ANR phenomenon of the content provider type may be generated.

Figure 1F:
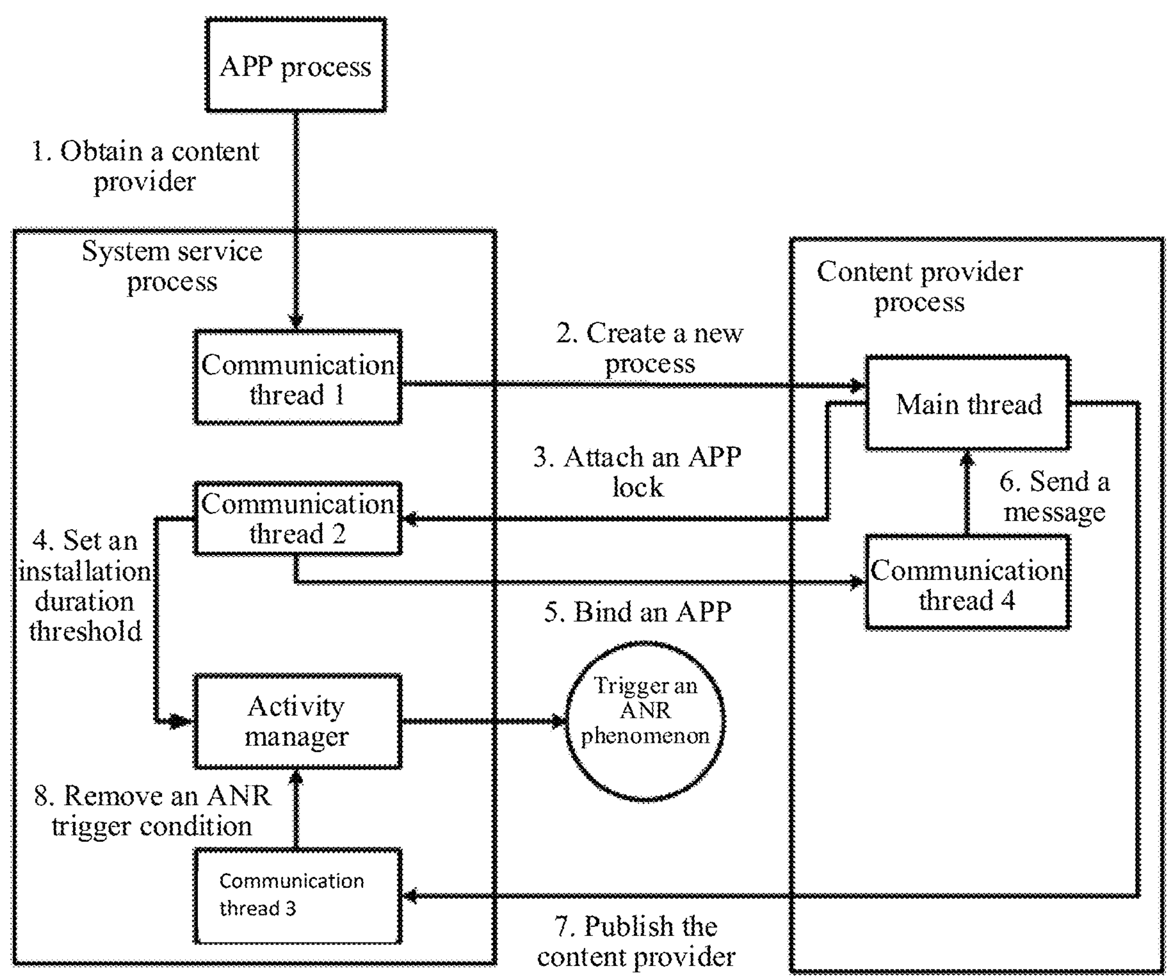
FIG. 1*f* is a schematic diagram of an example generation process of an ANR phenomenon of a content provider type according to one or more aspects described herein.

In the following description, ANR of an Android OS is used as an example to describe the ANR of the content provider type and reference may be made to a schematic diagram of an example generation process of ANR of a broadcast type shown in FIG. 1*f*. When an APP process of the target APP may initiate a request to obtain a content provider ContentProvider (getContentProvider) (as shown in step 1 in the figure), a system service process may allocate an idle thread binder_1 (e.g., a communication thread 1) to receive the request to obtain the ContentProvider. If it is detected that the ContentProvider is not started, a new process may be first created by Zygote through forking (e.g., as shown in step 2), and a new ContentProvider process may register itself with the system (attachapplicationlocked, attach an APP lock). A communication thread binder_2 (e.g., a communication thread 2) of a system_server process may receive the registration message (as shown in step 3), send a content provider publishing timeout message CONTENT PROVIDER PUBLISH_TIMEOUT_MSG to ActivityManager in the system_server process, and set the installation duration threshold (as shown in step 4). Next, the binder_2 may notify a thread binder_4 (e.g., a communication thread 4) of a provider process (e.g., the content provider process) to prepare to perform a processing task (binding an APP, bindApplication, as shown in step 5). The binder_4 may submit the notification to the main thread (e.g., sends a message to the main thread, sendMessage, as shown in step 6) after receiving the notification, and ad the event to a task queue. Next, the main thread may perform a series of tasks, such as installing the content provider herein and may alternatively include a task of publishing the content provider, then reporting to the system_server process that the installation task is completed, and returning content data of the obtained content provider (the published content provider, publishContentProvider as shown in step 7). Then a binder_3 thread (e.g., a communication thread 3) in the system_server may receive the message. If all the tasks are completed within the installation duration threshold, the ANR trigger condition may be removed and no ANR occurs (as shown in step 8 in the figure). Otherwise, the ANR may occur.

(IV) ANR Phenomenon of Input Event Dispatching Type

A generation process of the ANR phenomenon of the input event dispatching type may include: adding, in a case that an input event is received, a currently received input event to an input queue; waking up an input dispatching thread, the input dispatching thread being used for dispatching input events in the input queue to an APP process of a target APP in sequence for processing; and generating the ANR phenomenon of the input event dispatching type in a case that the APP process of the target APP is processing another input event at a dispatching turn of the currently received input event.

In some examples, a thread in a system service process may listen to an input event reported by an underlying layer, add the input event to the input queue to wait for dispatching and processing when receiving the input event, and wake up the input dispatching thread to dispatch input events in the input queue. In such examples, a dispatching start time point may be set. At the dispatching turn of the currently received input event, for example, at the dispatching time point of the currently received input event, if the APP process of the target APP is still processing another input event, this may indicate that the APP process cannot process the currently received input event that is about to be dispatched, and the ANR phenomenon of the input event dispatching type may be generated. In a cloud game scenario, the input event may be an operation event of an object in a game client. The operation event may arrive at a server running the cloud game in the form of an operation flow, but cannot be processed, resulting in the occurrence of the ANR.

In further examples, at the dispatching turn of the currently received input event, if the APP process of the target APP is not processing another input event, the currently received input event may be dispatched to the APP process through the input dispatching thread, so that the APP process calls one or more other processes to process the currently received input event and return feedback information upon completion of the processing. If the feedback information returned by the APP process is not received within a processing duration threshold, the ANR phenomenon of the input event dispatching type may be generated.

At the dispatching turn of the currently received input event, for example, the dispatching time point of the input event may be determined based on the dispatching start time point and the processing duration threshold, and the currently received input event may be dispatched to the APP process through the input dispatching thread, and, e.g., dispatched to a target window of the APP process, so that the APP process may call one or more other processes to process the currently received input event and return feedback information upon completion of the processing. The feedback information may be a notification message used for indicating completion of the input event. The called one or more processes may include processes having a parent-child relationship, and a parent process and a child process may share an address space.

If the feedback information returned by the APP process is not received within the processing duration threshold and a new input event is received, this may indicate that the currently received input event has not been processed within a specified processing duration threshold, and that the next input event is waiting for processing of the currently received input event. Such a scenario may result in the generation of the ANR phenomenon of the input event dispatching type. Conversely, during processing of the currently received input event, as long as no new input event is received, regardless of whether the feedback information returned by the APP process is received within the processing duration threshold or not, the ANR phenomenon of the input event dispatching type might not occur.

Figure 1G:
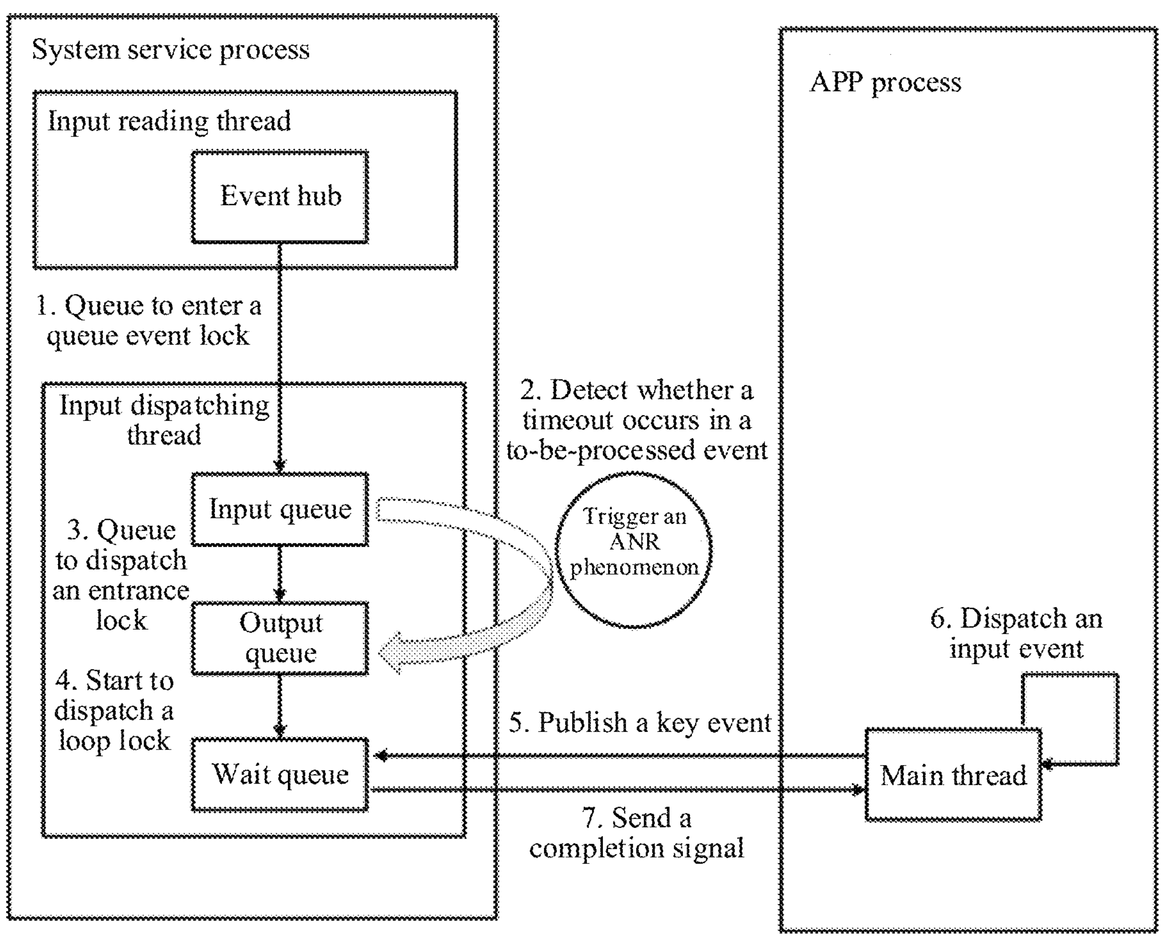
FIG. 1*g* is a schematic diagram of an example generation process of an ANR phenomenon of an input event dispatching type according to one or more aspects described herein.

In the following description, ANR of an Android OS is used as an example to describe the ANR of the input event dispatching typeand reference may be made to a schematic diagram of a generation process of ANR of an input event dispatching type shown in FIG. 1*g*. First, an InputReader thread (e.g., an input read thread) may listen to an input event reported by an underlying layer through EventHub (an event hub). Once an input event is received, the input event may be placed in an mInBoundQueue queue (an input queue, configured to store to-be-dispatched input events), and an InputDispatcher thread (an input dispatching thread) may be awakened (as shown in step 1). The InputDispatcher thread may start to dispatch the input events, set the dispatching start time point, first detect whether an event that is being processed exists, remove an event at a head of the mInBoundQueue if no event is being processed, and then detect whether the window is ready. When the window is ready, the event may be moved to an outBoundQueue queue (an output queue, configured to store input events to be dispatched to a target window). In this case, if end-to-end connection of an APP pipeline is normal, data may be removed from the outBoundQueue and placed in a waitQueue queue (a wait queue, configured to store input events waiting to be processed by the target window) (as shown in step 2 to step 4). Then, InputDispatcher may send a message to notify the target APP to prepare to perform the processing task. In this case, a main thread (e.g., main thread) of the target APP may receive the input event and forward the received input event layer by layer to the target window for processing. After the foregoing task is completed, a message may be sent to a system_server process to report that the task is completed (e.g., a completion signal is sent, as shown in step 7). Next, the system may remove the event from the waitQueue queue. If a time-consuming operation (for example, a file operation) is being processed in a current input system, each subsequent input event may detect whether a timeout occurs in a previous input event, and if the timeout occurs, the ANR may be generated.

It may be learned based on the foregoing description the ANR and analysis of source code (that is, system code) of the OS in which the ANR is generated that, in the ANR in a scenario such as Service, BroadcastQueue, ContentProvider, or Input, the APP process may interact with the system_server process, and request Zygote to create a new process (some are not shown, which may be understood as creation of a new process may be implemented through a Zygote process). These describe aspects of the underlying OS.

Aspects described herein resolve the problem of ANR by repairing system code. For example, site information of various ANR phenomena of a target APP may be collected. An execution status of the system code when the target APP generates the ANR phenomenon may be determined based on the site information. Through commonality analysis of the collected site information of the various ANR phenomena, a commonality analysis result may be determined. The commonality analysis is an analysis of searching for and identifying a common element. Based on the commonality analysis result obtained through the commonality analysis, a fault point at which the ANR phenomenon is generated may be determined from the system code of the OS, and allow for the repair of the system code based on the fault point. In this way, running of the target APP based on the repaired system code may effectively reduce a probability that the ANR phenomenon occurring, reduce crashing of the target APP or the OS due to the generation of the ANR phenomenon, and facilitate stable running of a system and an APP. The solution starts from the perspective of the underlying system, and fundamentally resolves the problem of the ANR on the OS by repairing the system code of the OS at the OS level, which is a fundamental solution with universality.

From the OS level, a trigger principle of the ANR i may be determined through in-depth study of the generation process of the ANR in the OS, the underlying architecture logic during generation of several types of ANR may be analyzed from the source code of the OS, and reconstruction of the architecture logic triggered by the ANR in the OS may be implemented by changing a system call function, to fundamentally resolve the ANR problem on the OS. Such a resolution may reduce crashing of an APP or a system, and improve compatibility and stability of the system and the APP. Since the reconstruction is performed on a native OS, and hard coding is not employed, strong binding does not exist with a specific platform, which enables the solution to enjoy a strong universality for various scenarios such as cloud games, terminals, and simulators, and enables the solution to deal with a plurality of ANR phenomena and effectively avoid various ANR problems.

Aspects described herein may be applied to various scenarios that generate ANR phenomena, for example, a terminal, a simulator, and a cloud game scenario. When the solution is applied to the cloud game scenario, the ANR problem in the cloud game scenario may be resolved, thereby improving compatibility and stability of a cloud game platform and improving user experience. The target APP may be a cloud game APP. In osme examples, a cloud game is an online game technology based on the cloud computing technology.

Cloud computing technology is a cloud technology. Cloud technology may include a hosting technology that unifies a series of resources such as hardware, software, and a network in a wide area network or a local area network to implement computing, storage, processing, and sharing of data. Cloud computing may refer to a computing mode that distributes computing tasks on a resource pool composed of a large quantity of computers, so that various APP systems can obtain computing power, storage space, and information services as required. A network that provides resources may be referred to as "cloud". Resources in the cloud seem to users to be infinitely expandable, readily accessible, available for on-demand usage, readily expandable, and payable based on usage. A basic capability provider of cloud computing may establish a cloud computing resource pool platform (referred to as a cloud platform for short, generally referred to as an infrastructure as a service (IaaS)), and deploy a plurality of types of virtual resources in the resource pool for external customers to choose and use. The cloud computing resource pool may mainly include a computing device (which is a virtualized machine, including an OS), a storage device, and a network device. According to aspects described herein, the cloud computing technology may alternatively be used for the commonality analysis of site information.

In the cloud game scenario, a game may be run in a cloud server, and high-consumption rendering calculation in the game may be performed in the cloud server. Images (e.g., pictures) and sound may be transmitted to a game terminal of a player through a network in the form of an audio/video stream, and a user operation instruction is transmitted to the cloud server in the form of an operation flow to perform corresponding calculation. Benefiting from the rapid development of a current mobile communication technology, such as 5G (the $5^{th}$ generation mobile communication technology, 5G for short), higher transmission bandwidth and a stronger concurrency capability bring a lower network delay, and also bring more development opportunities and a larger imagination space for the cloud game.

An environment in which the cloud game is run may be referred to as a cloud game environment. In the cloud game environment, a plurality of OSs may be run on one or more independent servers (for example, a server using an architecture such as an ARM/x86 architecture) by running a system container, and a relevant image may be transmitted to a remote receiving program for processing in the form of a video stream. The ARM architecture is a processor architecture having a 32-bit/64-bit reduced instruction set, and the x86 architecture is a computer language instruction set executed by a microprocessor. A container is a type of OS-level virtualization. The container may be configured to bear an OS, which may be implemented through an isolation mechanism (for example, namespace (a name space)). In a kernel mode, a plurality of OSs (e.g., a server OS and a device OS) may share the same kernel. In a user mode, the plurality of OSs may remain independent of each other. A server OS may be a general OS in a server, such as a Linux OS and/or an Android OS. The device OS is an OS in the container, such as the Android OS and/or an iOS OS.

Correspondingly, the system container may be an instance of the container, which may run based on the server OS (such as the Linux OS). For example, the system container may be an Android container running on the Linux OS. The Android container is loaded with an Android image. Mirroring is a file storage form. A plurality of files may be merged into one image file through the mirroring, which may facilitate dispatching and usage of the file. It is to be understood that the system container is not limited to Android containers. For example, if the iOS OS supports open-source development, the system container may alternatively be an iOS container, and the like. In the cloud game environment according to aspects described herein, a large quantity of system containers may be deployed on an independent server, and strong CPU capabilities and graphics processing unit (GPU) capabilities on a server side may be fully utilized, so as to implement high concurrency of execution of system operations, and increase the running speed of the cloud game.

Figures 2A, 2B:
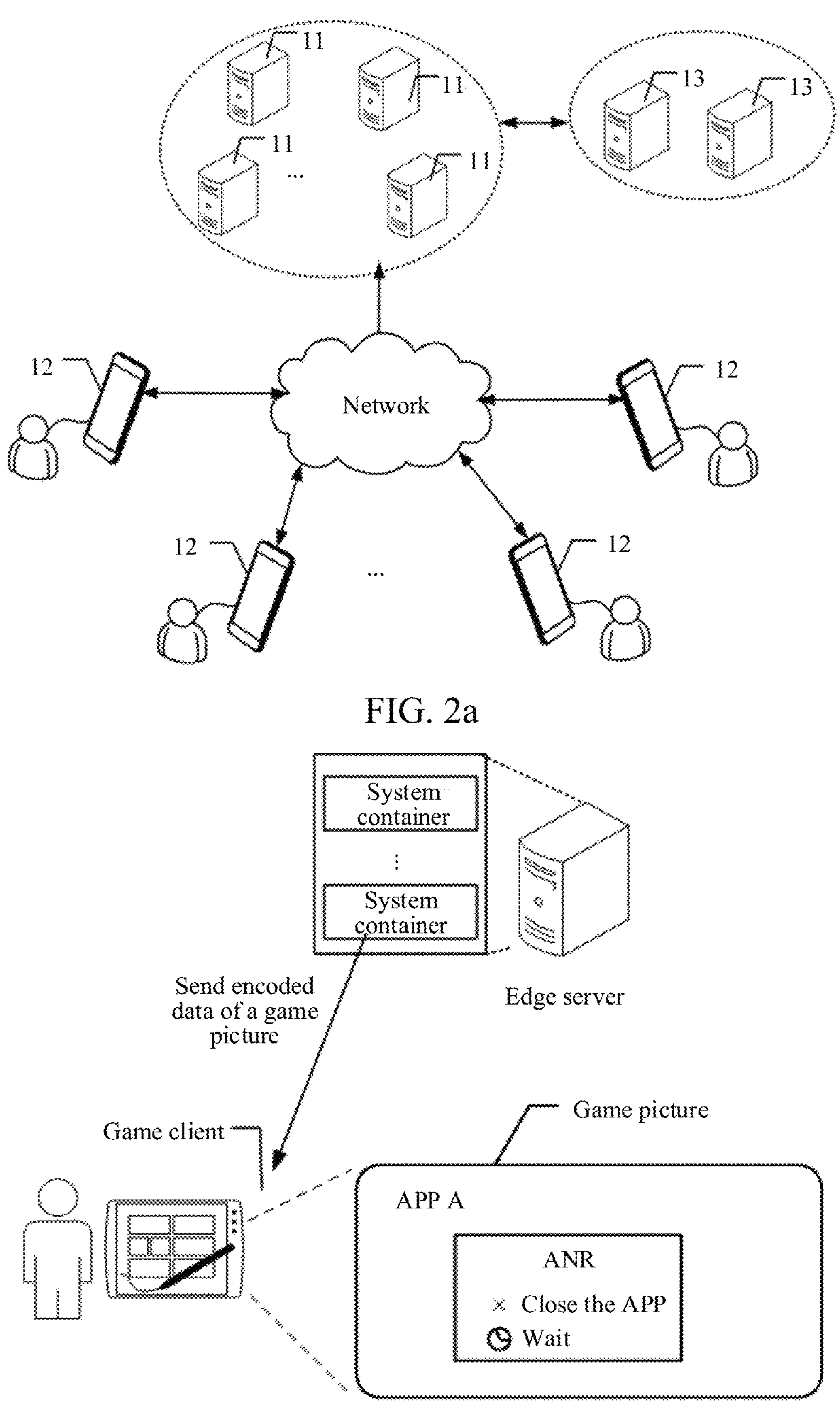
FIG. 2*a* is a diagram of an example architecture of a cloud game system according to one or more aspects described herein.
FIG. 2*b* is a schematic diagram of an example prompt for an ANR phenomenon in a cloud game according to one or more aspects described herein.

The cloud game environment may be supported by providing a corresponding running resource by a device in a cloud game system. Referring to a schematic diagram of an example architecture of a cloud game system shown in FIG. 2*a*, a cloud game system may include at least one edge server 11, a plurality of game clients 12, and at least one analysis server 13. The edge server may be a server having a cloud game run therein. At least one system container may be deployed in each edge server shown in FIG. 2*a*, and one or more game APPs may be installed in the system container. One or more cloud games may be run through the game APPs. In this way, the cloud game may be run through the system container. Each system container may be connected to at least one game client 12, thereby transmitting a game picture and sound of the cloud game to the connected game client 12. In addition, when ANR is generated during running of the cloud game on the edge server 11, a prompt may be displayed on the game client 12, as shown in FIG. 2*b*.

The analysis server 13 may be a server configured to analyze the ANR phenomenon occurring in an APP. During running of the cloud game APP in the system container of the at least one edge server 11, different types of ANR phenomena may occur in an APP in one or more edge servers. In this case, the analysis server 13 may collect site information generated during generation of at least two types of ANR phenomena in a cloud game APP in the edge server 11, perform commonality analysis on the site information of various ANR phenomena, find out, based on a commonality analysis result, a common fault point at which the ANR phenomenon is generated, repair system code of an OS through the common fault point, and run the cloud game APP based on the repaired system code, to resolve a problem of the ANR. The foregoing tasks may alternatively be performed by a target edge server. For example, any edge server in at least one edge server 11 may obtain site information of a plurality of ANR phenomena, and repair the system code of the OS based on the same principle above to resolve and avoid the ANR phenomenon.

The edge server and the analysis server may be independent physical servers, or may be a server cluster formed by a plurality of physical servers or a distributed system, and may further be a cloud server providing basic cloud computing services such as cloud service, a cloud database, cloud computing, a cloud function, cloud storage, a network service, cloud communication, a middleware service, a domain name service, a security service, a content delivery network (CDN), and a big data and artificial intelligence platform, which are not limited thereto.

The game client 12 may be a terminal device that provides basic capabilities such as streaming media playback capability, human-computer interaction capability, and communication capability, and/or may be an APP running in a terminal device. The terminal device includes but is not limited to devices such as a mobile phone, a computer, an intelligent voice interaction device, a smart home appliance, an onboard terminal, and an aircraft, which is not limited in this application. FIG. 2*a* only exemplarily represents the system architecture of the cloud game system, and does not limit the specific architecture of the cloud game system. For example, in some arrangements, the cloud game system may further include a background server for scheduling.

Figure 2C:
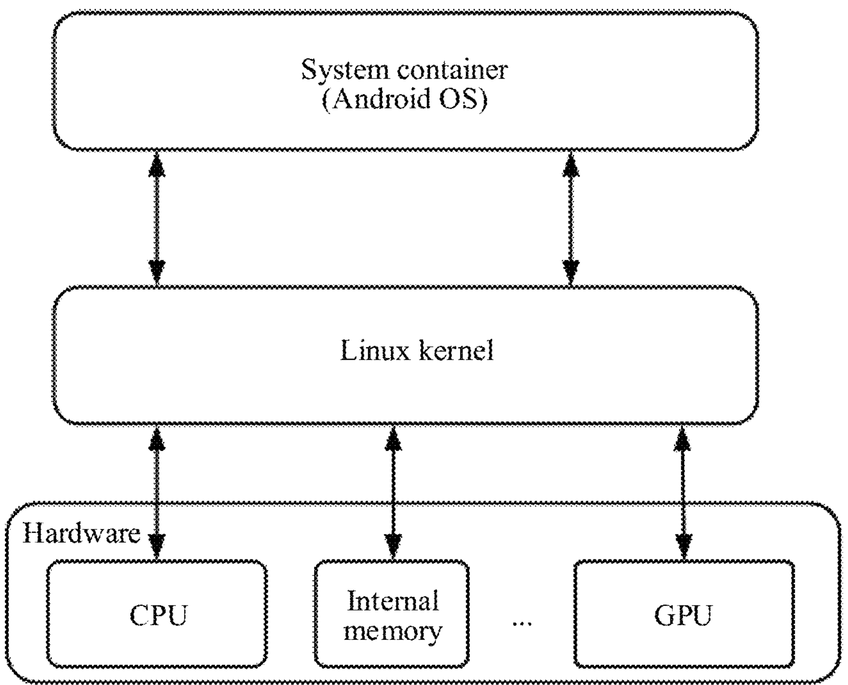
FIG. 2*c* is a schematic diagram of example underlying interaction logic of a system in a server in a cloud game scenario according to one or more aspects described herein.

Based on the cloud game environment and the cloud game system described above, for a cloud game deployed on the server side, a corresponding cloud game platform (which may provide a running environment and service for the cloud game) may be created based on a container technology and a system and kernel technology on the underlying layer and in combination with aspects such as audio and video technologies, network optimization, computing resource management on this basis. A plurality of cloud games may be run on the cloud game platform. The following exemplarily describes an interaction logic related to a system level in the running process of the cloud game by using an example in which the underlying layer of the cloud game is based on an Android native OS and a Linux kernel. As shown in FIG. 2*c*, the underlying interaction logic of a system in a server may relate to interaction among the system container, the Linux kernel, and hardware provided by the server.

During running of the cloud game in the system container, the system container or a game APP in the system container may send an operation request to an OS, and the OS may interact with the Linux kernel therein. The Linux kernel may receive the operation request, and the Linux kernel may call relevant hardware (for example, one or more of a CPU, a GPU, and a memory) to complete an operation corresponding to the operation request based on the operation request. The hardware may return an operation result corresponding to the operation request to the system container through the Linux kernel upon completion of execution based on the operation request. For example, when the operation request is a rendering request, a GPU provided by the server may be called based on the rendering request to execute a rendering event corresponding to the rendering request, to obtain a rendered game picture and return the rendered game picture through the Linux kernel. In one or more arrangements, an encoding module in the system container may also be called to compress the returned game picture, to obtain a compressed image. During the image compression, underlying hardware resources may be called for encoding through the Linux kernel, to obtain encoded data (e.g., the compressed image), and the compressed image is returned to the OS through the Linux kernel. After the encoded data is obtained, the compressed image may be transmitted to a game client in the form of a video stream.

Because the underlying layer of the cloud game may be also based on the OS, and ANR is a common phenomenon in the OS, ANR problems may also occur during running of the cloud game. The problem may be resolved by using the solution of repairing the system code to resolve the ANR phenomenon described above.

A data processing method for repairing the system code to resolve the ANR phenomenon is also provided. The data processing method may be performed by a computer device. The computer device may be a terminal or a server. When a target application is a cloud game APP, the computer device herein may be, for example, any analysis server 13 in the cloud game system shown in FIG. 2*a*. The data processing method may alternatively be jointly performed by the terminal and the server, which is not limited. For ease of understanding, the following uses an example in which the data processing method is performed by a computer device.

A terminal device may be one of a variety of devices such as a mobile phone, a computer, an intelligent voice interaction device, a smart home appliance, an onboard terminal, and an aircraft, and is not limited. The server may be an independent physical server, or may be a server cluster formed by a plurality of physical servers or a distributed system, and may further be a cloud server providing basic cloud computing services such as cloud service, a cloud database, cloud computing, a cloud function, cloud storage, a network service, cloud communication, a middleware service, a domain name service, a security service, a content delivery network (CDN), and a big data and artificial intelligence platform, and is not limited.

Figure 3A:
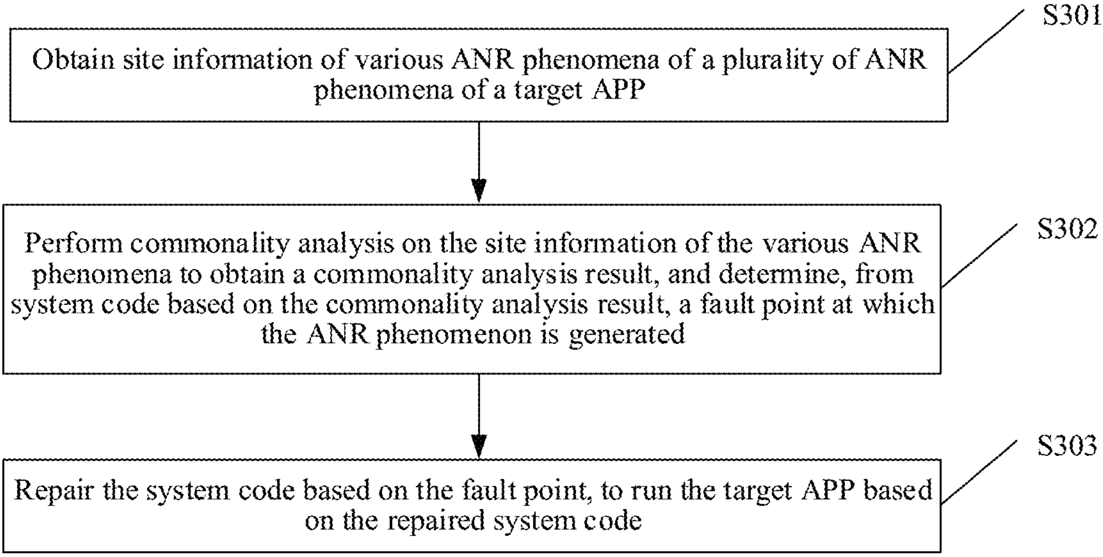
FIG. 3*a* is a schematic flowchart of an example data processing method according to one or more aspects described herein.

FIG. 3*a* is a schematic flowchart of an example data processing method. The data processing method may include steps S301 to S303.

S301: Obtain site information of various ANR phenomena among a plurality of ANR phenomena of a target APP.

The plurality of ANR phenomena of the target APP may be at least two types of ANR phenomena of the target APP (e.g., at least two of the foregoing described ANR phenomenon of the service type, ANR phenomenon of the broadcast type, ANR phenomenon of the content provider type, and ANR phenomenon of the input event dispatching type).

ANR phenomenon may be generated during running of the target APP based on system code of an OS. The ANR phenomenon of the target APP is a phenomenon that the target APP does not respond, and may be, for example, a phenomenon in which some events do not obtain an effective response within a predetermined time or a response time is excessively long. For ease of description, the ANR phenomenon of the target APP may be referred to as ANR or an ANR phenomenon for short.

The OS may be configured to control and manage hardware and software resources of a whole computer system, and properly organize and schedule allocation of tasks and resources of a computer, to provide convenient interfaces and environments for an object and other software. Categories of the OS include but are not limited to an Android OS, a Windows OS, a Linux OS, an iOS OS, and the like.

The OS may provide a running environment for an APP, and the APP may complete some events by calling a function provided by the OS (e.g., a system call). Therefore, the running of the target APP based on the system code of the OS may mean that the system code of the OS may be called during the running of the target APP. In this process, the ANR phenomenon may occur in the target APP, for example, an ANR phenomenon caused by incomplete creation of a listening service required by the target APP within a predetermined time when the system code of the Android OS is called to run the target APP. The target APP may be any APP running in a computer device, for example, an APP running in a terminal or a service program running in a server. The target APP may specifically be any one of a game APP, an audio and video APP, a social APP, a shopping APP, and the like. A cloud game scenario may be used as an example. The target APP may be a cloud game APP or a cloud game service program deployed in a system container of a server.

The ANR phenomenon of the target APP may be generated in different scenarios, and an ANR phenomenon generated in one scenario may correspond to a class of ANR phenomena. The Android OS is used as an example. In such an example, the ANR phenomenon may be generated in the following scenarios: ① a service timeout (Service Timeout): including both a foreground service timeout and a background service timeout, for example, a foreground service is not completed within 20 s; ② a broadcast timeout (Broadcast Timeout): including a foreground broadcast timeout and a background broadcast timeout, for example, foreground broadcast is not completed within 10 s; ③ a content provider timeout (ContentProvider Timeout): for example, an ANR phenomenon occurs at a timeout of 10 s after a content provider is published; and ④ an input event dispatching timeout (InputDispatching Timeout): including a key event and a touch event, such as a key response dispatching timeout (Key Dispatch Timeout) and a touch event dispatching timeout. For example, an ANR phenomenon may occur when a default key response dispatching duration of 5 s expires.

Site information may be automatically generated and collected during generation of each ANR phenomenon. A kind of ANR phenomenon may correspond to a class of site information. The site information of any ANR phenomenon may be used for describing an execution status of the system code during generation of a corresponding ANR phenomenon.

The site information of an ANR phenomenon may be relevant information captured by the OS during generation of the ANR phenomenon. The site information may be used for describing an execution status of the system code of the OS during generation of the ANR phenomenon. The execution status of the system code is for example a step of execution of the system code at which the ANR phenomenon occurs, a process or a thread during which an event response timeout occurs, or the like. It may be learned from the foregoing generation process of the ANR described in FIG. 1*d* to FIG. 1*g* that many processes may run during generation of the ANR. For example, processes running in the ANR of the service type may include a system service process, a service process, and another process that is not shown. Therefore, the site information may include relevant information of a process running in the system code, such as a process identifier (PID) of a process. In some examples, the site information may include but is not limited to the following content: a generation time of ANR, a trace file used for recording a stack of each thread of processes before and after the ANR is generated, an ANR type, information about each process during generation of the ANR (for example, a PID, a process name, a process execution start time and end time), and the like. The site information of various ANR phenomena may be recorded in a relevant log. During specific analysis, all or part of the site information may be obtained for further analysis.

Figure 3B:
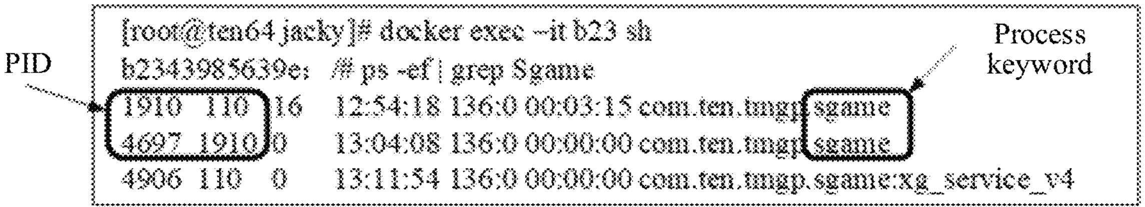
FIG. 3*b* is a schematic diagram of example site information of an ANR phenomenon generated in a cloud game scenario according to one or more aspects described herein.

Exemplarily, a cloud game scenario is used as an example. An example ANR scenario on a cloud game is illustrated in FIG. 3*b*. in FIG. 3*b*, the command "docker exec—it b23 sh b2343985639e" represents searching a container named b2343985639e for a location of a configuration file of a corresponding image. Additionally, ps-ef|grep Sgame indicates that a process including a keyword sgame is to be found and displayed in the container named b2343985639e. On a site where the cloud game platform shown in FIG. 3*b* generates the ANR phenomenon, obtained site information includes process information of each process (only portions are illustrated) in the container. A first line of information displayed is used as an example, which includes a PID 1910 of a process, a PID 110 of a parent process of the process (PPID), a percentage 16 of resources used by a CPU, a system start time 12:54:18, a CPU use time 00:03:15, a process name "com.ten.tmgp.sgame", and the like.

An execution status of the system code of the OS may be obtained during generation of various ANR phenomenon through collection of the site information of the various ANR phenomena, which facilitates subsequent analysis of a common characteristic of the generated ANR phenomena, to effectively avoid the ANR phenomenon on the OS. Aspects of these processes are described with reference to the description of S302 and S303.

S302: Perform commonality analysis on the site information of the various ANR phenomena to obtain a commonality analysis result, and determine, from the system code based on the commonality analysis result, a fault point at which the ANR phenomenon is generated.

The commonality analysis is an analysis method for searching for a common characteristic. The commonality analysis may be performed on the site information of various ANR phenomena herein, which means searching for the common characteristic that generates various ANR phenomena, to obtain the commonality analysis result. The commonality analysis result may include common information in the site information of the various ANR phenomena, for example, the same PID in all of the site information of the various ANR phenomena.

The fault point at which the ANR phenomenon is generated may be determined from the system code based on the commonality analysis result. The fault point may be a common fault point at which the various ANR phenomena are generated. The fault point may be fault code in the system code that causes the various ANR phenomena. For example, the ANR phenomena all may be ANR phenomena that are generated during use of a system call function. A common cause of generation of the ANR phenomena can be further learned through the fault point, thereby facilitating determination of a repairing manner of the system code.

There may be many reasons that cause generation of ANR, for example, ANR caused by deadlock, ANR caused by an insufficient I/O resource, and ANR caused by an infinite loop of a main thread. If a method for specific analysis for specific ANR is limited by a specific scenario (for example, an OS version, an APP version, or a terminal), a solution to the ANR in a different scenario might not be applicable. Therefore, such a solution might not be universal across various scenarios. The analysis mechanism provided in the solution is a commonality analysis mechanism. A commonality analysis result is obtained by searching for the common characteristic among the site information of various ANR phenomena, and the fault point at which the various ANR phenomena are generated is learned based on the commonality analysis result. Then any of the plurality of ANR phenomena of the target APP may be overcome through subsequent repairing, and the probability of occurrence of the ANR phenomena can be effectively reduced, which is universal and stable across various scenarios.

S303: Repair the system code based on the fault point, to allow execution of the target APP based on the repaired system code.

Because the fault point is determined from underlying system code, the system code of the OS may be repaired based on the fault point, to obtain the repaired system code. The repairing may include a modification of the system code. The repaired system code may include optimization of original system code based on the fault point. The target APP may be run or executed based on the repaired system code. During running of the target APP, the repaired system code is called. Because the system code optimizes the fault point at which the ANR phenomenon is generated, generation of the ANR phenomenon can be effectively avoided during running of an APP.

In this way, reconstruction of a native OS is implemented through repairing of the system code of the OS. Due to the modification of the system code, problems during generation of the plurality of ANR phenomena may be resolved in principle, and the OS may be deployed in any device or platform. In this way, the solution might not only be applied to a cloud game platform, but also effectively resolve an instability phenomenon of the cloud game platform due to generation of the ANR and improve the stability of the cloud game platform. The solution may also be applied to a terminal device (for example, a mobile phone), a simulator (for example, an Android simulator) product, an OS platform (for example, another Android platform), and the like, which has a strong universality across scenarios and can effectively avoid various ANR phenomena.

Through the described data processing solution, collection of the site information of various ANR phenomena of the target APP is supported. Because the site information may be used for describing the execution status of the system code during the generation of the ANR phenomenon, the execution status of the system code may be analyzed from the OS level through commonality analysis of the site information of the plurality of ANR phenomena, the underlying layer may be searched for the common characteristic that leads to various ANR phenomena to obtain the commonality analysis result, the fault point at which the ANR phenomena is generated may be determined based on the commonality analysis result, then the system code of the OS may be repaired based on the fault point, and the target APP may be run based on the repaired system code. In this way, during running of the target APP, the repaired system code may intercept possible ANR phenomena from an OS side. The data processing solution may be suitable for most ANR scenarios and may avoid a great majority of ANR problems. The solution may start from the underlying system code of the OS, fundamentally resolve the problem of ANR on the OS, have a strong universality, and can reduce a case of any ANR phenomenon occurring in the OS or the target APP, thereby effectively improving stability of a system or an APP. When the solution is applied to a cloud game platform, compatibility and stability of the cloud game platform can be improved, and game experience of a player can be improved.

Figure 4:
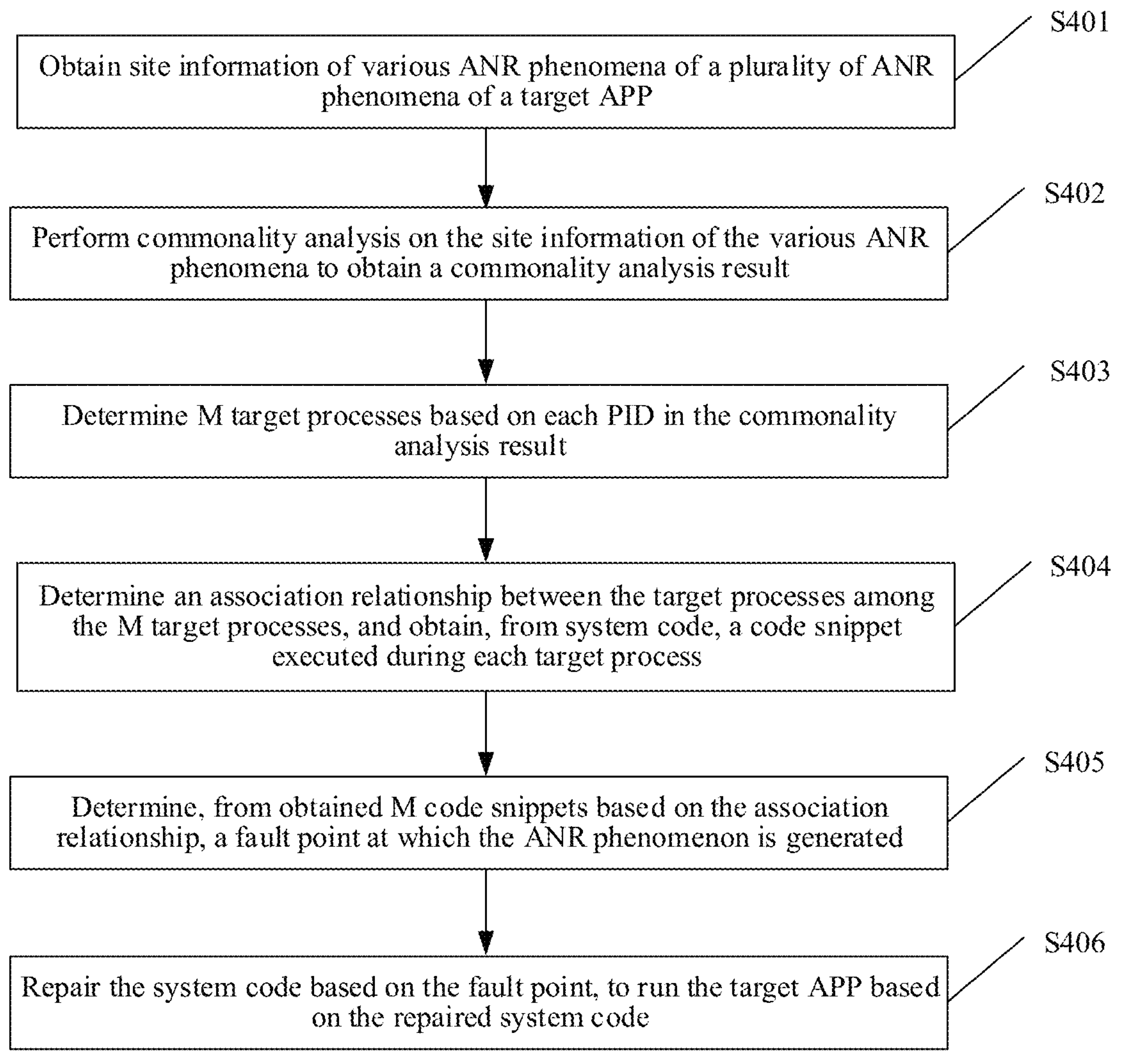
FIG. 4 is a schematic flowchart of another example data processing method according to one or more aspects described herein.

FIG. 4 is a schematic flowchart of another example data processing method. The data processing method may include S401 to S406:

S401: Obtain site information of various ANR phenomena among a plurality of ANR phenomena of a target APP.

S402: Perform commonality analysis on the site information of the various ANR phenomena to obtain a commonality analysis result.

In some examples, the system code may include a plurality of processes and a code snippet executed by each process, and the site information of any ANR phenomenon may include a PID of each process run in the system code during generation of the corresponding ANR phenomenon.

A plurality of processes may exist in the system code. A process may be an execution process of a program. An executable program may become a process after being run. The process may execute code in a running environment. The system code may include the code snippet executed by each of the plurality of processes. The code snippet may be a part of the system code executed by the process. For example, when the system code is compiled and then run, the system code may run as a plurality of process instances, and each process instance may execute a corresponding code snippet.

Because the ANR phenomenon is generated during running of the target APP, system code of an OS may be called during the running of the target APP. Each process included in the system code may be run to execute the corresponding code snippet. Therefore, the site information may include the PID corresponding to the run process. The PID may include information used for marking a process. The PID may be a process name, a keyword of the process name, or the like.

Based on the foregoing content, the commonality analysis may be performed based on the PID included in the site information. An optional implementation of S402 may be: traversing, for any of the site information of various ANR phenomena, each PID in the any site information; searching each piece of site information other than the any site information for a currently traversed PID; adding the currently traversed PID to the commonality analysis result in a case that the currently traversed PID is found; and continuously traversing each PID in the any site information in a case that the currently traversed PID is not found.

The any site information is the site information of any ANR phenomenon among the obtained site information of the various ANR phenomena. Each PID in the any site information may be traversed. During traversing, for the currently traversed PID, the site information of other ANR phenomena may be searched for the currently traversed PID. The currently traversed PID is a PID being traversed in the any site information. If the currently traversed PID is found, it indicates that a PID that is the same as the currently traversed PID exists in other site information. A process corresponding to the PID may be also run during generation of another ANR phenomenon. The currently traversed PID that is found may be a common PID of the various ANR phenomena. The currently traversed PID may be added to the commonality analysis results. If the currently traversed PID is not found, it indicates that the PID that is the same as the currently traversed PID does not exist in the other site information, and then other PIDs in the site information of any ANR phenomenon may be continuously traversed.

For example, the obtained site information of the plurality of ANR phenomena includes site information of four types of ANR phenomena. The site information of the four types of ANR phenomena may be respectively site information a of an ANR phenomenon of type A, site information b of an ANR phenomenon of type B, site information c of an ANR phenomenon of type C, and site information d of an ANR phenomenon of type D. For purposes of this example, it is assumed that the PID included in the site information is the process name, the site information b, the site information c, and the site information d may be searched for a process name game in the site information a that is currently being traversed. When the process name is found in the site information b, the site information c, and the site information d, the found process name may be added to the commonality analysis result. It may be understood that the implementation of the commonality analysis is not limited to the above-described processes and may include different processes. For example, the commonality analysis may be performed based on a thread, but is not limited to such.

Each piece of the other site information may be searched for the same PID by using, as a benchmark, the PID that is being traversed in the site information of any ANR phenomenon, so as to implement analysis of a common characteristic in the system code. The PID is usually a concise representation, for example, a number or a simple character, so as to improve efficiency of the commonality analysis while efficiently searching for the same PID.

According to some aspects, the commonality analysis result includes the common PID among the site information of the various ANR phenomena. Based on this, a manner of determining a fault point from the system code based on the commonality analysis result may include steps S403 to S405 of FIG. 4. The common PID may be implemented by using the foregoing optional implementation of S402, or may be implemented in another manner.

S403: Determine M target processes based on each PID in the commonality analysis result.

Because the PID may be used for marking the process, the process corresponding to each PID in the commonality analysis result may be determined as the target process, thereby obtaining the M target processes. M is a positive integer greater than 1, and a value of M is equal to a quantity of PIDs in the commonality analysis result. For example, if the commonality analysis result includes two PIDs: process1 and process2, a process corresponding to process1 and a process corresponding to process2 may be both used as target processes. In this way, two target processes may be determined based on the two PIDs in the commonality analysis result.

S404: Determine an association relationship between the target processes among the M target processes, and obtain, from the system code, a code snippet executed by each target process.

The association relationship between the target processes may be used for describing a hierarchical relationship between at least two of the M target processes. The association relationship includes but is not limited to a parent-child relationship, a sibling relationship, and the like. An association relationship may exist between a process and one or more other processes. For example, process1 may be a parent process of process2, and process1 may be a child process of process4. In other words, process1 and process2 are in a parent-child relationship, and process1 and process4 are also in a parent-child relationship, but process1 plays a different role in the parent-child relationship with process4 as compared to the parent-child relationship with process2.

In some examples, the M target processes include a first process and a second process, that is, two target processes. The first process and the second process are common processes during generation of the various ANR phenomena, which may be processes that are to be run before the ANR phenomenon is generated.

One or more arrangements for determining the association relationship between the target processes in the M target processes may include: obtaining attribute information of the first process and attribute information of the second process from the site information of the various ANR phenomena, the attribute information of any process including a PID of the any process and a PID of a process calling the any process; and determining that an association relationship between the first process and the second process is a parent-child relationship in a case that the attribute information of the second process includes the PID of the first process or the attribute information of the first process includes the PID of the second process.

The site information of the any ANR phenomenon may include attribute information corresponding to a process run in the system code during generation of the ANR phenomenon. Attribute information of the process (e.g., the target process) corresponding to the PID in the commonality analysis result may be obtained from the site information of the various ANR phenomena. In this case, the target process includes the first process and the second process, and the attribute information of the process obtained from the site information specifically includes the attribute information of the first process and the attribute information of the second process. The attribute information of a process may be information used for describing a feature of the process. The attribute information of any process may include the PID of the process and the PID of another process calling that any process. For example, in the case of process A, if a process B calls the process A, attribute information of the process A may include a PID (e.g., the PID of the any process) of the process A and a PID (e.g., the PID of the process calling the any process) of the process B. The PID of the process and another process that calls the current process may be learned through the attribute information. The PID may be a unique identifier assigned to a process by the OS during creation of a process. The PID may be represented by a natural number, for example, 123 and 605, or may be represented by a binary number, for example, 001 and 010. The representation of the PID is not limited to these examples.

The attribute information of the first process includes the PID of the first process and a PID of another process calling that first process. The attribute information of the second process includes the PID of the second process and a PID of another process calling that second process. Next, the attribute information of any process may be selected for analysis, which may include the following:

(1) If the attribute information of the second process includes the PID of the first process, it indicates that the first process is calling the second process (i.e., the PID of the process calling the second process is the PID of the first process). Accordingly, it may be determined that the association relationship between the first process and the second process is the parent-child relationship, where the first process is a parent process of the second process, and the second process is a child process of the first process.

(2) If the attribute information of the first process includes the PID of the second process, it indicates that the second process is calling the first process (i.e., the PID of the process calling the first process in the attribute information of the first process is the PID of the second process). Accordingly, it may be determined that the association relationship between the first process and the second process is the parent-child relationship, where the first process is a child process of the second process, and the second process is a parent process of the first process.

Exemplarily, in the foregoing scenario shown in FIG. 3*b* in which the cloud game platform generates various ANR phenomena, the site information is generated and collected. Therefore, the commonality analysis result may include relevant content of the process shown in FIG. 3*b*. As illustrated in FIG. 3*b*, an OS may have two sgame processes simultaneously, which are respectively a process with a PID of 1910 and a process with a PID of 4697. It may be found based on the PID that a PPID of the second process (e.g., the process with the PID of 4697) includes PID 1910, that is, the first sgame process. It may be learned from this that the two processes are in the parent-child relationship, in which the second process is a child process of the first process, and the first process is a child process of a process with a PID of 110.

(3) If the attribute information of the second process does not include the PID of the first process, and the attribute information of the first process does not include the PID of the second process, it indicates that the process calling the second process is not the first process but another process, and the process calling the first process is not the second process but another process. In this way, it may be determined that the association relationship between the first process and the second process is not the parent-child relationship but another relationship, for example, a sibling relationship. For example, the first process and the second process may be both child processes of the same process. In the particular example, it is assumed that the first process with the PID of 1910 and the second process with a PID of 4906 are both the sgame processes, but the PPIDs of the first process and the second process are both 110. In other words, the first process and the second process are both the child processes of the process with the PID of 110. It may be determined that the two processes are in the sibling relationship.

Accordingly, a relationship between a PID of a process and a PID of another process may be determined through the PID of the process and the PID of the process calling the process included in the attribute information of the process, so that the association relationship between the processes is determined very conveniently.

Because each process may execute the corresponding code snippet in the system code during running, the code snippet executed by each target process may be obtained from the system code. Due to existence of M target processes, M code snippets may be obtained, so as to subsequently determine, from each code snippet, the fault point at which the ANR phenomenon is generated, as discussed with respect to S405 below.

S405: Determine, from the obtained M code snippets based on the association relationship, the fault point at which the ANR phenomena is generated.

Each of the M code snippets may be executed by a corresponding process in the M target processes. The fault point at which the ANR phenomenon is generated may be determined from the obtained M code snippets through the association relationship between the processes in the M target processes. The fault point may be a code statement or a piece of code in one of the M code snippets. Because the code snippets are executed during generation of various ANR phenomena, the fault point is a common fault point for the various ANR phenomena. Due to existence of the fault point, any ANR phenomenon may be triggered. An ANR phenomenon that is specifically triggered may be determined in combination with other information, such as a type of an event executed by a process, for example, an input dispatching event executed by a process. In this way, it may be determined that the triggered ANR phenomenon is an ANR phenomenon triggered by an input event dispatching timeout.

In the foregoing steps S403 to S405, the target process may be determined through the PID included in the commonality analysis result, the association relationship between the target processes may be further determined, the code snippet executed by each target process may be obtained from the system code, and the fault point at which the ANR phenomenon is generated may be analyzed based on the association relationship and the obtained code snippet. This manner starts from the system code of the underlying OS. After the commonality analysis on the various ANR phenomena is performed, the commonality analysis result may be used for determining the system code executed during generation of the various ANR phenomena, the fault point may be determined from the system code, and then a common reason causing the ANR can be determined from the system level, so as to fundamentally repair the system code to resolve the problem of ANR.

S406: Repair the system code based on the fault point, to run the target APP based on the repaired system code.

As discussed, the commonality analysis may be performed on the obtained site information of the plurality of ANR phenomena, and common processes (for example, processes corresponding to common PIDs) run during generation of the ANR phenomenon in the target APP may be found. The common processes may be further analyzed as the target processes, which may regress to the system code of the OS. The fault point at which the ANR phenomenon is generated may be determined from the code snippet executed by the target process based on the association relationship. The fault point may be specifically determined from the code snippet executed by the target process. In this way, a root reason of generation of the ANR phenomenon may be determined from the underlying layer of the system, so as to fundamentally resolve the problem of ANR. After the system code is repaired based on the fault point, the repaired system code may effectively reduce the case of generation of the ANR phenomenon during running of the target APP, and improve overall stability of running of an APP and the system.

Figures 5, 6A:
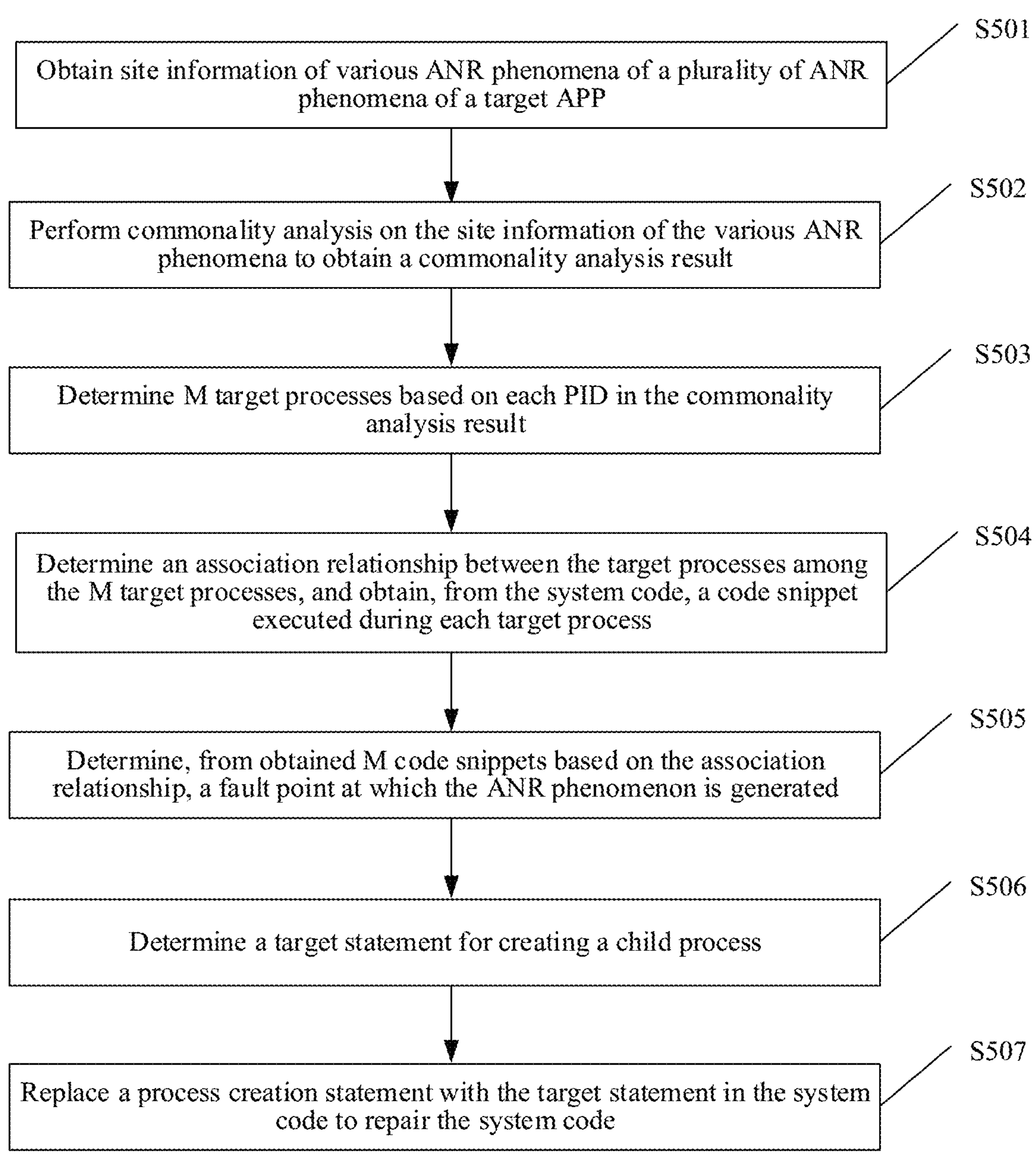
FIG. 5 is a schematic flowchart of still another example data processing method according to one or more aspects described herein.
FIG. 6*a* is a schematic diagram of an example result of a call stack of a parent process according to one or more aspects described herein.

FIG. 5 is a schematic flowchart of another example data processing method. The data processing method may include S501 to S507:

S501: Obtain site information of various ANR phenomena among a plurality of ANR phenomena of a target APP.

S502: Perform commonality analysis on the site information of the various ANR phenomena to obtain a commonality analysis result.

S503: Determine M target processes based on each PID in the commonality analysis result.

S504: Determine an association relationship between the target processes among the M target processes, and obtain, from the system code, a code snippet executed by each target process.

S505: Determine, from the obtained M code snippets based on the association relationship, the fault point at which the ANR phenomena is generated.

In an embodiment, the M target processes include a first process and a second process, and an association relationship between the first process and the second process is a parent-child relationship, the first process being a parent process of the second process, and the second process being a child process of the first process. The association relationship between the first process and the second process may be determined based on the PID included in the attribute information of the process as described in the foregoing examples.

S505 may include the following content: determining, as a benchmark code snippet based on the parent-child relationship, an obtained code snippet executed by the first process; determining a first code statement from the benchmark code snippet, the first code statement being a code statement executed by the first process before the ANR phenomenon occurs; analyzing a call stack of the first process along the first code statement in the code snippet executed by the first process in a case that the first code statement is a statement for implementing a function call operation, the call stack including various functions called by the first process; determining, in a case that an objective function that fails to be called exists in the call stack, logical code of the objective function from the benchmark code snippet; and determining, from the logical code of the objective function based on a code snippet executed by the second process, the fault point at which the ANR phenomenon is generated. Aspects of these processes may be implemented according to the description of aspects of FIG. 4.

The code snippet executed by the first process may include a large quantity of code statements. In this example, before the ANR phenomenon occurs, some code statements in the code snippet may be executed, and then the execution stops during the first process. A similar principle is applicable to the second process. That is, due to the parent-child relationship between the first process and the second process, the code snippet executed by the first process serving as the parent process may include code creating the second process. Therefore, the code snippet executed by the first process may be first determined as the benchmark code snippet for analysis. The benchmark code snippet is a code snippet used as an analysis benchmark. The first code statement may be determined from the benchmark code snippet. The first code statement is the code statement executed by the first process before the ANR phenomenon occurs. The first code statement may be determined to determine whether the first code statement satisfies an analysis condition, and then further analysis is performed. For example:

(1) When the first code statement is the statement for implementing the function call operation, the call stack of the first process may be analyzed along the first code statement in the code snippet executed by the first process.

A relevant executable program or a system command may be called based on the first code statement to implement the function call operation. Exemplarily, the first code statement executed by the first process as the parent process may specifically be a statement that executes Runtime.getRuntime( ).exec("xxx. exe"). Runtime.getRuntime( ).exec( ) is used for calling an external executable program or a system command. Runtime.getRuntime( ) returns a current Runtime object of an APP. The exec( ) method for the object may be an instruction to create a child process to execute a designated executable program (which is an executable program named "xxx.exe" herein, "xxx.exe" representing a name of a program to be executed), and return a Process object instance corresponding to the child process. Through a Process, execution of the child process may be controlled or information of the child process may be obtained.

A last code statement executed by the parent process before generating the ANR is the first code statement. The first code statement may be further analyzed: The call stack of the first process may be analyzed along the first code statement in the code snippet executed by the first process, the call stack including various functions called by the first process. For analysis of the call stack, a corresponding debugging tool may be used based on a type of the code snippet executed by the first process. For example, if the code snippet executed by the first process is Java code, printStackTrace (a debugging tool for a location and a cause of an error that occurs programmatically in printing exception information to a command line) may be used. If the code snippet executed by the first process is Native C code, strace (a debugging tool for intercepting and recording system call executed by a process and a signal received during the process) may be used. The call stack of the corresponding process may be analyzed by using the debugging tools. The call stack may alternatively be understood as a mechanism for an interpreter (such as a JavaScript interpreter in a browser) to follow up on a function execution flow. Through the mechanism, it can be learned that which function is being executed and which function in an executed function body is being called.

The following uses an example in which ANR occurs in a cloud game scenario. Analysis is performed based on site information of ANR on a cloud game platform, to determine that an OS has two sgame processes simultaneously, and the two processes are in the parent-child relationship. A call stack on site is captured by using a debugging tool, and it is determined, through the call stack, that the parent process is a statement (e.g., the first code statement) that executes Runtime.getRuntime( ).exec( ) before the ANR occurs. A call stack of the parent process found along Runtime.getRuntime( ).exec( ) is shown in FIG. 6*a*. Specifically, a Runtime class calls an exec method, a ProcessBuilder class is created by using the exec method, and a ProcessImpl class is created by using a ProcessBuilder.start( ) method. Then, a Unix process is created by using a start( ) method, a Unix process object is created through the new Unixprocess, and a new process is created through forking based on the Unix process object. The new process executes program code different from that executed by the Unix process, to obtain UnixProcess_md.c. Then a new process is created through forking based on a Unix process, and program code different from that executed by the Unix process is executed. Finally, a startChild function is called. The foregoing is the call stack of the parent process, and the last function call to the startChild function in the call stack of the parent process is an approximate location where a program error occurs.

If an objective function that fails to be successfully called exists in the call stack, it indicates that an error occurs in the code snippet executed by the first process, and a location of the error is at the objective function. The function calls in the call stack of the parent process shown in FIG. 6*a* are only shown up to the startChild function, which indicates that the program crashes when the first process executes the start-Child function. Therefore, the objective function may be further analyzed. Logical code of the objective function is determined from the code snippet executed by the first process. The logical code is a part of the code snippet executed by the first process. The fault point at which the ANR phenomenon is generated may be determined, based on the code snippet executed by the second process, from the logical code corresponding to the objective function. In this case, the fault point is specifically a code statement in the logical code corresponding to the objective function.

(2) When the first code statement is not a statement for implementing the function call operation, for example, when the first code statement is another code statement, a code statement related to the another code statement may be analyzed based on an execution status of the code statement.

It may be learned that, through analysis of code snippets executed by the processes having the parent-child relationship, specifically through analysis of the call stack of the first process as the parent process, an actual execution status of the code snippets during the parent process may be determined. In this way, it may be determined, based on the actual execution status, that a fault point at which the ANR phenomenon is generated is specifically located in the logical code of the objective function which crashes during execution, and thus a location range of the fault point may be further reduced.

In one or more examples, the logical code of the objective function includes a process creation statement, the process creation statement being a statement for creating a child process, the child process created by using the process creation statement sharing a same address space with a corresponding parent process.

Exemplarily, logical code of the objective function shown in FIG. 6*b* is provided based on the objective function in the call stack of the parent process in FIG. 6*a*, which includes the process creation statement. The objective function is the startChild function analyzed based on the call stack of the parent process in FIG. 6*a*. Example logic of the startChild function shown in FIG. 6*b* is: if START_CHILD uses vfork(if START_CHILD_USE_VFORK), a process may be created by using a process creation statement Volatile pid_t resultPid=vfork( ). One reason for using such logic is as follows: the call to vfork is separated into a separate start-Child function, which may ensure that a child stack is prevented from corrupting a parent stack, as suggested by a gcc warning. The gcc warning is specifically that a variable "foo" may be corrupted by "longjmp" or "vfork". The foo represents a variable of data, a function, or a command, and the longjmp is a jump manner. The vfork is a system call of Linux, and a process created by using the system call shares an address space with the parent process and the child process. In other words, a child process created by using the system call vfork shares the same address space with a parent process corresponding to the child process. In this way, the child process runs entirely in the address space of the parent process. If a variable during the child process is modified, the parent process is directly affected.

For the first process and the second process in the parent-child relationship, the second process is the child process of the first process. That is, the first process is the parent process, and the second process is the child process. The first process may create the second process by executing the process creation statement in the objective function. In this way, the first process and the second process share the same address space. The address space may be a set of all available resources. The shared address space herein may be a physical address space or a virtual address space.

Determining the fault point at which the ANR phenomenon is generated from the logical code of the objective function based on the code snippet executed by the second process may include: determining a second code statement from the code snippet executed by the second process; determining, based on the second code statement, a target resource that needs to be read during the second process in a case that the second code statement is a statement for implementing a data reading operation; and determining the process creation statement in the logical code of the objective function as the fault point at which the ANR phenomenon is generated in a case that the target resource is held by the first process, the second process being the child process of the first process, the second process being blocked in a case that the target resource is held by the first process, and the ANR phenomenon being triggered in a case that a duration for which the second process is blocked is greater than a duration threshold.

The second code statement may be first determined from the code snippet executed by the second process. The second code statement is the code statement executed by the second process before the ANR phenomenon occurs. Because the second process may execute a plurality of code statements in the corresponding code snippet before the ANR phenomenon occurs, and some code statements might not be suitable for analysis in a subsequent analysis manner, the second code statement may be analyzed to determine whether the second code statement satisfies the analysis condition. For example:

(1) When the second code statement is a statement for implementing the data reading operation, it indicates that the second code statement satisfies the analysis condition, and the second code statement may be further analyzed. The read data is locked during performing of the data reading operation by the second code statement, which means that another process cannot access the data. The target resource required for performing the data reading operation by the second process may be determined. A code statement of the data reading operation may be, for example, a code statement for reading a file resource. Exemplarily, the second process executes a readdir( ) function to read/proc/self/fd. readdir( ) is usually used for traversing files in a folder, and/proc/self/fd represents a file descriptor in a current process directory.

The target resource required for performing the data reading operation by the second process may be an available resource in the address space, for example, hardware resources such as a CPU and a memory. If the target resource is held by the first process, it indicates that the first process holds the target resource required for the second process to read data, and the first process shares the address space with the second process. Then the second process is to be blocked and waits for the first process to release the target resource. When the duration for which the second process is blocked is greater than the duration threshold, for example, when the duration for which the second process is blocked is 10 s and the duration threshold is 8 s, the duration for which the second process is blocked is greater than the duration threshold, the ANR phenomenon may be generated. Based on the foregoing analysis, the ANR phenomenon is caused due to the manner of process creation. Therefore, the process creation statement in the logical code of the objective function may be determined as the fault point at which the ANR phenomenon is generated. On the contrary, if the target resource is not held by the first process, it indicates that the target resource may be used during the second process, and no ANR phenomenon is generated.

(2) When the second code statement is not a statement for implementing the data reading operation, another content may be analyzed based on specific content indicated by the second code statement.

In some examples, the analysis of the objective function may be implemented in combination with the code snippet executed by the second process. Because the statement for the data reading operation exists in the code snippet executed by the second process, when the target resource required by the data reading operation is held by the first process, because the two processes share the address space, the ANR phenomenon of the target APP may be triggered. Based on the logic, it may be determined that generation of the ANR phenomenon is caused by the process creation statement in the logical code of the objective function, and then the process creation statement may be determined as the fault point.

Based on the foregoing description of the manner of determining the fault point at which the ANR phenomenon is generated, it may be determined that the fault point includes the objective function of the code snippet executed by the first process, and, more specifically, includes the process creation statement in the objective function. Therefore, implementation of the objective function may be modified in the OS. In an embodiment, a manner of repairing the system code based on the fault point may include the following processes described in S506 to S507.

S506: Determine a target statement for creating a child process.

The target statement for creating the child process is a code statement different from the process creation statement. Although the target statement has a function similar to the process creation statement, that is, both the target statement and the process creation statement can create the child process, the child process created by the target statement and a corresponding parent process independently use different address spaces. The corresponding parent process is a process that calls the child process created by the target statement. The child process does not share the address space with the corresponding parent process. In this way, during performing of the data reading operation during the child process, the required target resource is not held by the first process, but in an independent address space, so as to effectively avoid the generation of the ANR phenomenon of an APP.

In an arrangement, the process creation statement includes a function field, the function field having a first system call function stored therein, where the process creation statement may create the child process by using the first system call function. The function field included in the process creation statement may store the first system call function. The first system call function may be provided by the OS. In the system code of the OS, the process creation statement may create the child process by using the first system call function. For example, in the process creation statement Volatile pid_t resultPid=vfork( ) the function field is resultPid, and vfork( ) is the first system call function.

According to one or more examples, S506 may include: modifying the first system call function in the function field of the process creation statement to a second system call function, to obtain the target statement for creating the child process, the target statement creating the child process by using the second system call function.

The second system call function is a system call function different from the first system call function and is also provided by the OS. Under the second system call function, the address spaces of the child process created by using the second system call function and the corresponding parent process are independent of each other. Because the system call function is a kernel function provided by the OS, modification to the system call function is a modification performed at a kernel level. In this way, the ANR problem on the OS may be resolved from the kernel level, which can improve compatibility and stability of a platform, and effectively prevent and avoid the ANR phenomenon.

S507: Replace the process creation statement with the target statement in the system code, to repair the system code.

After the target statement is determined, the process creation statement in the original system code may be replaced with the target statement. In this way, the first system call function may be disabled and replaced with the second system call function, to repair the system code at the kernel level. In a case that the first process is the parent process and the second process is the child process, because the second process created by using the target statement independently uses the different address space from the first process, the target resource may be successfully used to perform the data reading operation without blocking during running of the target APP based on the repaired system code, thereby avoiding occurrence of the ANR phenomenon.

For example, a process code creation statement Volatile pid_t resultPid=vfork( ) may be modified to a target statement Volatilepid_tresultPid=fork( ) and if START_CHILD_USE_VFORK may also be modified to if START_CHILD_USE_FORK. In this way, vfork( ) is disabled and changed to fork( ).

In view of the integrity of the OS, the modification to the process code creation statement in the objective function may affect other parts of code in the system code of the OS other than the objective function. Therefore, other content of the system code may alternatively be adaptively modified to adapt to the repair of the objective function. The system code may be repaired in the foregoing manner to generate the repaired system code. The target APP may then be run based on the repaired system code.

The repaired content of the system code of the OS may be customized modified content for the system code. The modified content relates to a change to a system call of the kernel, which may intercept possible ANR from a kernel side and a system side, and deal with most of scenarios in which the ANR may occur. In addition, the modified content does not include a policy of strong binding with a specific platform, and does not include hard coding either. Therefore, loose coupling with a device or a platform may be implemented, so that a repaired OS is applicable to any scenario, for example, a cloud game, a real terminal device, or a simulator, so as to effectively avoid the ANR phenomenon, and improve stability and compatibility of the platform or the device.

In some arrangements, for the customized modified system code, quality inspection may be further performed on the repaired system code. The quality inspection includes code review and security detection during writing of the system code. The security problem existing in the customized system code may be found through security checks during code writing, to ensure security of the repaired system code. Code review is also referred to as code recheck, which is an operation of checking compliance of source code with an encoding standard and code quality by reading the code. Through the code review, the code quality can be improved, and a potential error (bug) can be found. The security check and the code review both may be performed by using corresponding analysis tools. In this way, it may be ensured that all data satisfies an expected situation, and the ANR problem is resolved while ensuring compatibility and stability of the OS.

Through processing by using the foregoing repairing solution, in a cloud game scenario, during test of running a cloud game based on the repaired code and in an actual online service process, no ANR occurs on a cloud game platform, which can reduce a frequency of occurrences of the ANR. It may be understood that, because the cloud game platform is an OS and belongs to the system side, and a large quantity of other game APPs and other APPs are run in the system, a small quantity of ANR phenomena may exist, but the probability is extremely low.

Through the data processing solutions provided herein, the site information of various ANR phenomena of the target APP may be obtained for collection. Because the site information is used for describing the execution status of the system code during the generation of the ANR phenomenon, the execution status of the system code may be analyzed from the OS level through commonality analysis of the site information of the plurality of ANR phenomena, the underlying layer may be searched for the common characteristic that leads to various ANR phenomena to obtain the commonality analysis result. The commonality analysis result may include a common PID. A plurality of target processes are determined based on the common PID, and a code snippet executed by each target process is analyzed. Specifically, an execution status of a code snippet by a process may be followed up by using the call stack, and a more specific fault point may be determined based on the call stack and execution logic of other code snippets. In this process, various debugging tools may be used to follow up and debug a problem to determine the fault point. Customized reconstruction may be performed on the OS based on the fault point. Specifically, a system function called during process creation may be modified from the kernel level, thereby effectively resolving the ANR phenomena. Because the ANR problem of the OS may be resolved through repairing of the system kernel level, the compatibility and stability can be significantly improved.

FIG. 7 is a schematic structural diagram of an example data processing apparatus. The data processing apparatus may be a computer program (including program code) running on a computer device. For example, the data processing apparatus may be or include APP software. The data processing apparatus may be configured to perform the processes described herein. As shown in FIG. 7, a data processing apparatus 700 may include at least one of an obtaining module 701 and a processing module 702.

The obtaining module 701 may be configured to obtain site information of various ANR phenomena among a plurality of ANR phenomena of a target APP, any ANR phenomenon being generated during running of the target APP based on system code of an OS, the site information of the any ANR phenomenon being used for describing an execution status of the system code during generation of a corresponding ANR phenomenon.

The processing module 702 may be configured to perform commonality analysis on the site information of the various ANR phenomena to obtain a commonality analysis result, and determine, from the system code based on the commonality analysis result, a fault point at which the ANR phenomenon is generated, the commonality analysis result including common information in the site information of the various ANR phenomena.

The processing module 702 may be configured to repair the system code based on the fault point, to run the target APP based on the repaired system code.

In one or more arrangements, the system code may include a plurality of processes and a code snippet executed by each process. The site information of any ANR phenomenon may include a PID of each process run in the system code during generation of the corresponding ANR phenomenon. The processing module 702 may be configured to: traverse, for any of the site information of various ANR phenomena, each PID in the any site information; search each piece of site information other than the any site information for a currently traversed PID; add the currently traversed PID to the commonality analysis result in a case that the currently traversed PID is found; and continuously traverse each PID in the any site information in a case that the currently traversed PID is not found.

In some examples, the commonality analysis result includes a PID shared among the site information of the various ANR phenomena. The processing module 702 may be configured to: determine M target processes based on each PID in the commonality analysis result, a value of M being equal to a quantity of PIDs in the commonality analysis result; determine an association relationship between the target processes among the M target processes, and obtain the code snippet executed by each target process from the system code; and determine, from obtained M code snippets based on the association relationship, a fault point at which the ANR phenomenon is generated.

In one or more arrangements, the M target processes include a first process and a second process. The processing module 702 may be configured to: obtain attribute information of the first process and attribute information of the second process from the site information of the various ANR phenomena, the attribute information of any process including a PID of the any process and a PID of a process calling the any process; and determine that an association relationship between the first process and the second process is a parent-child relationship in a case that the attribute information of the second process includes the PID of the first process or the attribute information of the first process includes the PID of the second process.

In some examples, the M target processes include a first process and a second process, and an association relationship between the first process and the second process is a parent-child relationship. The first process is a parent process of the second process. The processing module 702 may be configured to: determine, as a benchmark code snippet based on the parent-child relationship, an obtained code snippet executed by the first process; determine a first code statement from the benchmark code snippet, the first code statement being a code statement executed by the first process before the ANR phenomenon occurs; analyze a call stack of the first process along the first code statement in the code snippet executed by the first process in a case that the first code statement is a statement for implementing a function call operation, the call stack including various functions called by the first process; determine, in a case that an objective function that fails to be called exists in the call stack, logical code of the objective function from the benchmark code snippet; and determine, from the logical code of the objective function based on a code snippet executed by the second process, the fault point at which the ANR phenomenon is generated.

Additionally or alternatively, the logical code of the objective function may include a process creation statement, the process creation statement being a statement for creating a child process, the child process created by using the process creation statement sharing a same address space with a corresponding parent process. The processing module 702 may be configured to: determine a second code statement from the code snippet executed by the second process, the second code statement being a code statement executed by the second process before the ANR phenomenon occurs; determine, based on the second code statement, a target resource required for performing a data reading operation during the second process in a case that the second code statement is a statement for implementing the data reading operation; and determine the process creation statement in the logical code of the objective function as the fault point at which the ANR phenomenon is generated in a case that the target resource is held by the first process, the second process being the child process of the first process, the second process being blocked in a case that the target resource is held by the first process, and the ANR phenomenon being triggered in a case that a duration for which the second process is blocked is greater than a duration threshold.

In some examples, the processing module 702 may be configured to: determine a target statement for creating a child process, the child process created by the target statement and a corresponding parent process independently using different address spaces; and replace the process creation statement with the target statement in the system code to repair the system code.

In some examples, the process creation statement may include a function field, the function field having a first system call function stored therein, and the process creation statement creates the child process by using the first system call function. The processing module 702 may be configured to modify the first system call function in the function field of the process creation statement to a second system call function, to obtain the target statement for creating the child process, the target statement creating the child process by using the second system call function.

According to one or more aspects, the plurality of ANR phenomena of the target APP may include an ANR phenomenon of a service type. A generation process of the ANR phenomenon of the service type may include: setting a service duration threshold in response to a service creation request sent by an APP process of a target APP; sending a service creation message to a service process, to cause the service process to notify, based on the service creation message, the service process to call one or more other processes to perform a service creation task and return feedback information after a service is successfully created; and generating the ANR phenomenon of the service type in a case that the feedback information returned by the service process is not received within the service duration threshold.

In some arrangements, the plurality of ANR phenomena of the target APP may include an ANR phenomenon of a broadcast type. A generation process of the ANR phenomenon of the broadcast type may include: setting a broadcast duration threshold in response to a broadcast sending request initiated by an APP process of a target APP; sending a broadcast registration message to a broadcast receiving process, to cause the broadcast receiving process to notify, based on the broadcast registration message, the broadcast receiving process to call one or more other processes to perform a broadcast task and return feedback information after a broadcast is completed; and generating the ANR phenomenon of the broadcast type in a case that the feedback information returned by the broadcast receiving process is not received within the broadcast duration threshold.

According to one or more aspects, the plurality of ANR phenomena of the target APP may include an ANR phenomenon of a content provider type. A generation process of the ANR phenomenon of the content provider type may include: detecting, in response to a request to obtain a content provider initiated by an APP process of a target APP, a start state of a content provider process corresponding to the content provider; creating the content provider process in a case that the start state indicates that the content provider process is not started, and notifying the content provider process to call one or more other processes, install the content provider, and return feedback information after installing the content provider, the content provider being equipped with an installation duration threshold; and generating the ANR phenomenon of the content provider type in a case that the feedback information returned by the content provider process is not received within the installation duration threshold.

In some examples, the plurality of ANR phenomena of the target APP may include an ANR phenomenon of an input event dispatching type. A generation process of the ANR phenomenon of the input event dispatching type may include: adding, in a case that an input event is received, a currently received input event to an input queue, and waking up an input dispatching thread, the input dispatching thread being used for dispatching input events in the input queue to an APP process of a target APP in sequence for processing; and generating the ANR phenomenon of the input event dispatching type in a case that the APP process of the target APP is processing another input event at a dispatching turn of the currently received input event.

The functions of each functional module of the data processing apparatus described may be implemented based on the methods and processes described herein. For the details of these methods and processes, reference may be made to the related description above. Details are not described herein again. In addition, for the description of the beneficial effects of using the same method, details are not described again.

FIG. 8 is a schematic structural diagram of an example computer device. A computer device 800 may include an independent device (for example, one or more of a server, a node, and a terminal), or may include a component (for example, a chip, a software module, or a hardware module) inside an independent device. The computer device 800 may include at least one processor 801 and a communication interface 802. Further, in one or more arrangements, the computer device 800 may further include at least one memory 803 and a bus 804. The processor 801, the communication interface 802, and the memory 803 may be connected to each other through the bus 804.

The processor 801 may be a module that performs an arithmetic operation and/or a logical operation, which may specifically be one or a combination of more of processing modules such as a CPU, a GPU, a microprocessor unit (MPU), an application specific integrated circuit (ASIC), a field programmable gate array (FPGA), a complex programmable logic device (CPLD), a co-processor (which assists the CPU in completing corresponding processing and application), and a microcontroller unit (MCU).

The communication interface 802 may be configured to provide information input or output for the at least one processor, and/or the communication interface 802 may be configured to receive data sent from the outside and/or send data to the outside, may be a wired link interface including an Ethernet cable, or may be a wireless link (Wi-Fi, Bluetooth, universal wireless transmission, an onboard short-range communication technology, and another short-range wireless communication technology) interface. The communication interface 802 may serve as a network interface.

The memory 803 may be configured to provide a storage space. Data such as an OS and a computer program may be stored in the storage space. The memory 803 may be one or a combination of more of a random access memory (RAM), a read-only memory (ROM), an erasable programmable read-only memory (EPROM), or a compact disc read-only memory (CD-ROM), and the like.

The at least one processor 801 in the computer device 800 may be configured to call the computer program stored in the at least one memory 803, and may be configured to perform the data processing method described in the embodiment shown in this application.

In a possible implementation, the processor 801 in the computer device 800 may be configured to call the computer program stored in the at least one memory 803, and may be configured to perform the following operations.

In some arrangements, the processor 801 may be configured to: obtain site information of various ANR phenomena among a plurality of ANR phenomena of a target APP, any ANR phenomenon being generated during running of the target APP based on system code of an OS, the site information of the any ANR phenomena being used for describing an execution status of the system code during generation of a corresponding ANR phenomenon; perform commonality analysis on the site information of the various ANR phenomena to obtain a commonality analysis result, and determine, from the system code based on the commonality analysis result, a fault point at which the ANR phenomenon is generated; and repair the system code based on the fault point, to run the target APP based on the repaired system code. The commonality analysis result includes common information in the site information of various ANR phenomena.

It is to be understood that the computer device 800 may perform any of the methods and processes previously described, or may perform the above description of the data processing apparatus 700 corresponding to FIG. 7. Details are not described herein again. In addition, for the description of the beneficial effects of using the same method, details are not described again.

In addition, an exemplary arrangement further provides a storage medium. The storage medium may store the computer program for executing the data processing methods and processes described herein. When one or more processors load and execute the computer program, aspects of the data processing methods and processes may be implemented, and the details are not described herein again. For the description of the beneficial effects of using the same method, details are not described herein again. It may be understood that a program instruction may be deployed and executed on one or a plurality of computer devices that can communicate with each other.

The foregoing storage medium may be the data processing apparatus or an internal storage unit of a computer device, for example, a hard disk or an internal memory of the computer device. The storage medium may alternatively be an external storage device of the computer device, for example, a plug-in hard disk, a smart media card (SMC), a secure digital (SD) card, and a flash card equipped on the computer device. Further, the storage medium may further include both the internal storage unit and the external storage device of the computer device. The storage medium may be configured to store the computer program and another program and data required by the computer device. The storage medium may further be configured to temporarily store data that has been outputted or that is to be outputted.

One or more aspects provide a computer program product, the computer program product including a computer program, the computer program being stored in a computer-readable storage medium. A processor of a computer device may read the computer program from the computer-readable storage medium, and the processor may execute the computer program, so that the computer device performs the methods and processes described herein.

The steps of the methods and processes described herein may be reordered, merged, and deleted based on an actual need.

The apparatus modules described herein may be merged, divided, and deleted based on an actual need.

The foregoing disclosure provides merely some aspects, and is not intended to limit the scope of the invention. A person of ordinary skill in the art may understand that all or part of the processes described herein may be implemented, and equivalent changes may still fall within the scope of this disclosure.

What is claimed is:

1. A data processing method, performed by a computer device, the method comprising:

obtaining site information of various application not responding (ANR) phenomena among a plurality of ANR phenomena of a target application (APP), each ANR phenomenon of the ANR phenomena being generated during running of the target APP based on system code of an operating system (OS) on which the APP is being executed, the site information of each ANR phenomenon of the ANR phenomena describing an execution status of the system code during generation of the corresponding ANR phenomenon;

performing commonality analysis on the site information of the various ANR phenomena to obtain a commonality analysis result;

determining, from the system code and based on the commonality analysis result, a fault point of a first ANR phenomenon is generated, the commonality analysis result comprising common information in the site information across the various ANR phenomena; and repairing the system code based on the fault point of the first ANR phenomenon; and wherein the first ANR phenomenon is of a service type, and the first ANR phenomenon is generated through steps comprising:

setting a service duration threshold in response to a service creation request transmitted by an APP process of the target APP;

transmitting a service creation message to a service process, to notify, based on the service creation message, the service process to call one or more other processes to perform a service creation task and return feedback information after a service is successfully created; and generating the first ANR phenomenon in a case that the feedback information returned by the service process is not received within the service duration threshold.

2. The method according to claim 1, wherein the system code comprises a plurality of processes and a code snippet executed by each process of the plurality of processes, and the site information of each ANR phenomenon comprises a process identifier (PID) of each process run in the system code during generation of the corresponding ANR phenomenon; and the performing commonality analysis on the site information of the various ANR phenomena to obtain a commonality analysis result comprises:

traversing, for the site information of the various ANR phenomena, each PID in the site information, including:

searching each piece of site information other than the site information for a corresponding ANR, a currently traversed PID;

adding the currently traversed PID to the commonality analysis result in a case that the currently traversed PID is found in another piece of site information other than the site information for the corresponding ANR; and continuously traversing each PID in the site information in a case that the currently traversed PID is not found.

3. The method according to claim 1, wherein the commonality analysis result comprises a PID shared among the site information of at least two of the various ANR phenomena, and the determining, from the system code based on the commonality analysis result, a fault point at which the first ANR phenomenon is generated comprises:

determining M target processes based on each PID in the commonality analysis result, a value of M being equal to a quantity of PIDs in the commonality analysis result;

determining an association relationship between two or more target processes among the M target processes, and obtaining, from the system code, a code snippet executed by each of the M target processes; and determining, from the obtained M code snippets based on the association relationship, the fault point at which the first ANR phenomenon is generated.

4. The method according to claim 3, wherein the M target processes comprise a first process and a second process, and the determining an association relationship between two or more target processes among the M target processes comprises:

obtaining attribute information of the first process and attribute information of the second process from the site information of the various ANR phenomena, the attribute information of each of the first process and the second process comprising a PID (PID) of the respective process and a PID of a process calling the respective process; and determining that the association relationship between the first process and the second process is a parent-child relationship in a case that the attribute information of the second process comprises the PID of the first process or the attribute information of the first process comprises the PID of the second process.

5. The method according to claim 3, wherein the M target processes comprise a first process and a second process, and an association relationship between the first process and the second process is a parent-child relationship, the first process being a parent process of the second process; and the determining, from obtained M code snippets based on the association relationship, the fault point at which the first ANR phenomenon is generated comprises:

determining, as a benchmark code snippet based on the parent-child relationship, an obtained code snippet executed by the first process;

determining a first code statement from the benchmark code snippet, the first code statement being a code statement executed by the first process before the first ANR phenomenon occurs;

analyzing a call stack of the first process along the first code statement in the code snippet executed by the first process in a case that the first code statement is a statement for implementing a function call operation, the call stack comprising one or more functions called by the first process;

determining, in a case that an objective function that fails to be called exists in the call stack, logical code of the objective function from the benchmark code snippet; and determining, from the logical code of the objective function based on a code snippet executed by the second process, the fault point at which the first ANR phenomenon is generated.

6. The method according to claim 5, wherein the logical code of the objective function comprises a process creation statement, the process creation statement being a statement for creating a child process, the child process created by using the process creation statement sharing a same address space with a corresponding parent process; and the determining, from the logical code of the objective function based on a code snippet executed by the second process, the fault point at which the first ANR phenomenon is generated comprises:

determining a second code statement from the code snippet executed by the second process, the second code statement being a code statement executed by the second process before the first ANR phenomenon occurs;

determining, based on the second code statement in a case that the second code statement is a statement for implementing a data reading operation, a target resource required by the second process to perform the data reading operation; and determining the process creation statement in the logical code of the objective function as the fault point at which the first ANR phenomenon is generated in a case that the target resource is held by the first process, the second process being a child process of the first process, the second process being blocked in a case that the target resource is held by the first process, and the first ANR phenomenon being triggered in a case that a duration for which the second process is blocked is greater than a duration threshold.

7. The method according to claim 6, wherein the repairing the system code based on the fault point comprises:

determining a target statement for creating a child process, the child process created by the target statement and a corresponding parent process independently using different address spaces; and replacing the process creation statement with the target statement in the system code, to repair the system code.

8. The method according to claim 7, wherein the process creation statement comprises a function field, the function field having a first system call function stored therein, the process creation statement creating the child process by using the first system call function; and the determining a target statement for creating a child process comprises:

modifying the first system call function in the function field in the process creation statement to a second system call function, to obtain the target statement for creating the child process, the target statement creating the child process by using the second system call function.

9. The method according to claim 1, wherein a second ANR phenomenon is of a broadcast type, and the generation process of the second ANR phenomenon comprises:

setting a broadcast duration threshold in response to a broadcast transmission request initiated by an APP process of the target APP;

transmitting a broadcast registration message to a broadcast receiving process, to notify, based on the broadcast registration message, the broadcast receiving process to call one or more other processes to perform a broadcast task and return feedback information after a broadcast is completed; and generating the second ANR phenomenon in a case that the feedback information returned by the broadcast receiving process is not received within the broadcast duration threshold.

10. The method according to claim 1, wherein, a second ANR phenomenon is of a content provider type, and the generation process of the second ANR phenomenon comprises:

detecting, in response to a request to obtain a content provider initiated by an APP process of the target APP, a start state of a content provider process corresponding to the content provider;

creating the content provider process in a case that the start state indicates that the content provider process is not started, and notifying the content provider process to: call one or more other processes, install the content provider, and return feedback information after installing the content provider, the content provider being equipped with an installation duration threshold; and generating the second ANR phenomenon in a case that the feedback information returned by the content provider process is not received within the installation duration threshold.

11. The method according to claim 1, wherein, a second ANR phenomenon is of an input event dispatching type, and the generation process of the second ANR phenomenon comprises:

adding, in a case that an input event is received, the currently received input event to an input queue, and waking up an input dispatching thread, the input dispatching thread being used for dispatching the input events in the input queue to an APP process of the target APP in sequence for processing; and generating the second ANR phenomenon of the input event dispatching type in a case that the APP process of the target APP is processing another input event at a dispatching turn of the currently received input event.

12. A data processing apparatus, comprising:

a processor; and memory storing computer-readable instructions that, when executed, cause the data processing apparatus to:

obtain site information of various ANR phenomena among a plurality of ANR phenomena of a target APP, each ANR phenomenon of the ANR phenomena being generated during running of the target APP based on system code of an operating system (OS) on which the APP is being executed, the site information of each ANR phenomenon of the ANR phenomena describing an execution status of the system code during generation of the corresponding ANR phenomenon;

perform commonality analysis on the site information of the various ANR phenomena to obtain a commonality analysis result;

determine, from the system code based on the commonality analysis result, a fault point at which a first ANR phenomenon is generated, the commonality analysis result comprising common information in the site information across the various ANR phenomena;

repair the system code based on the fault point of the first ANR phenomenon; and wherein the first ANR phenomenon is of a service type, and the first ANR phenomenon is generated through steps comprising:

setting a service duration threshold in response to a service creation request transmitted by an APP process of the target APP;

transmitting a service creation message to a service process, to notify, based on the service creation message, the service process to call one or more other processes to perform a service creation task and return feedback information after a service is successfully created; and generating the first ANR phenomenon of the service type in a case that the feedback information returned by the service process is not received within the service duration threshold.

13. The data processing apparatus according to claim 12, wherein the system code comprises a plurality of processes and a code snippet executed by each process of the plurality of processes, and the site information of each ANR phenomenon comprises a process identifier (PID) of each process run in the system code during generation of the corresponding ANR phenomenon; and the performing commonality analysis on the site information of the various ANR phenomena to obtain a commonality analysis result comprises:

traversing, for the site information of the various ANR phenomena, each PID in the site information, including:

searching each piece of site information other than the site information for a corresponding ANR, a currently traversed PID;

adding the currently traversed PID to the commonality analysis result in a case that the currently traversed PID is found in another piece of site information other than the site information for the corresponding ANR; and continuously traversing each PID in the site information in a case that the currently traversed PID is not found.

14. The data processing apparatus according to claim 13, wherein the commonality analysis result comprises a PID shared among the site information of at least two of the various ANR phenomena, and the determining, from the system code based on the commonality analysis result, a fault point at which the first ANR phenomenon is generated comprises:

determining M target processes based on each PID in the commonality analysis result, a value of M being equal to a quantity of PIDs in the commonality analysis result;

determining an association relationship between two or more target processes among the M target processes, and obtaining, from the system code, a code snippet executed by each of the M target processes; and determining, from the obtained M code snippets based on the association relationship, the fault point at which the first ANR phenomenon is generated.

15. The data processing apparatus according to claim 14, wherein the M target processes comprise a first process and a second process, and the determining an association relationship between two or more target processes among the M target processes comprises:

obtaining attribute information of the first process and attribute information of the second process from the site information of the various ANR phenomena, the attribute information of each of the first process and the second process comprising a PID (PID) of the respective process and a PID of a process calling the respective process; and determining that the association relationship between the first process and the second process is a parent-child relationship in a case that the attribute information of the second process comprises the PID of the first process or the attribute information of the first process comprises the PID of the second process.

16. A non-transitory computer-readable storage medium, having a computer program stored therein, the computer program, when executed by a processor, causes an apparatus to perform:

obtaining site information of various application not responding (ANR) phenomena among a plurality of ANR phenomena of a target application (APP), each ANR phenomenon of the ANR phenomena being generated during running of the target APP based on system code of an operating system (OS) on which the APP is being executed, the site information of each ANR phenomenon of the ANR phenomena describing an execution status of the system code during generation of the corresponding ANR phenomenon;

performing commonality analysis on the site information of the various ANR phenomena to obtain a commonality analysis result;

determining, from the system code based on the commonality analysis result, a fault point at which a first ANR phenomenon is generated, the commonality analysis result comprising common information in the site information across the various ANR phenomena;

repairing the system code based on the fault point of the first ANR phenomenon;

wherein the first ANR phenomenon is of a service type, and wherein the computer program, when executed, further causes the apparatus to perform a generation process of the first ANR phenomenon, comprising:

setting a service duration threshold in response to a service creation request transmitted by an APP process of the target APP;

transmitting a service creation message to a service process, to notify, based on the service creation message, the service process to call one or more other processes to perform a service creation task and return feedback information after a service is successfully created; and generating the first ANR phenomenon in a case that the feedback information returned by the service process is not received within the service duration threshold.

17. The non-transitory computer-readable storage medium according to claim 16, wherein the system code comprises a plurality of processes and a code snippet executed by each process of the plurality of processes, and the site information of each ANR phenomenon comprises a process identifier (PID) of each process run in the system code during generation of the corresponding ANR phenomenon; and the performing commonality analysis on the site information of the various ANR phenomena to obtain a commonality analysis result comprises:

traversing, for the site information of the various ANR phenomena, each PID in the site information, including:

searching each piece of site information other than the site information for a corresponding ANR, a currently traversed PID;

adding the currently traversed PID to the commonality analysis result in a case that the currently traversed PID is found in another piece of site information other than the site information for the corresponding ANR; and continuously traversing each PID in the site information in a case that the currently traversed PID is not found.

18. The non-transitory computer-readable storage medium according to claim 17, wherein the commonality analysis result comprises a PID shared among the site information of at least two of the various ANR phenomena, and the determining, from the system code based on the commonality analysis result, a fault point at which the first ANR phenomenon is generated comprises:

determining M target processes based on each PID in the commonality analysis result, a value of M being equal to a quantity of PIDs in the commonality analysis result;

determining an association relationship between two or more target processes among the M target processes, and obtaining, from the system code, a code snippet executed by each of the M target processes; and determining, from the obtained M code snippets based on the association relationship, the fault point at which the first ANR phenomenon is generated.

19. The non-transitory computer-readable storage medium according to claim 18, wherein the M target processes comprise a first process and a second process, and the determining an association relationship between two or more target processes among the M target processes comprises:

obtaining attribute information of the first process and attribute information of the second process from the site information of the various ANR phenomena, the attribute information of each of the first process and the second process comprising a PID (PID) of the respective process and a PID of a process calling the respective process; and determining that the association relationship between the first process and the second process is a parent-child relationship in a case that the attribute information of the second process comprises the PID of the first process or the attribute information of the first process comprises the PID of the second process.

* * * * *